US010592441B2

(12) United States Patent
Mishra et al.

(10) Patent No.: US 10,592,441 B2
(45) Date of Patent: Mar. 17, 2020

(54) BUS COMMUNICATION ENHANCEMENT BASED ON IDENTIFICATION CAPTURE DURING BUS ARBITRATION

(71) Applicant: QUALCOMM Incorporated, San Diego, CA (US)

(72) Inventors: Lalan Jee Mishra, San Diego, CA (US); Christopher Kong Yee Chun, Austin, TX (US); Richard Dominic Wietfeldt, San Diego, CA (US); Mohit Kishore Prasad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/960,356

(22) Filed: Apr. 23, 2018

(65) Prior Publication Data

US 2018/0329838 A1 Nov. 15, 2018

Related U.S. Application Data

(60) Provisional application No. 62/504,455, filed on May 10, 2017.

(51) Int. Cl.
*G06F 13/16* (2006.01)
*G06F 13/42* (2006.01)

(52) U.S. Cl.
CPC ...... *G06F 13/1605* (2013.01); *G06F 13/1673* (2013.01); *G06F 13/4291* (2013.01); *G06F 2213/0016* (2013.01)

(58) Field of Classification Search
CPC ............. G06F 13/1605; G06F 13/1673; G06F 13/4291
USPC ........................................................ 710/113
See application file for complete search history.

(56) References Cited

U.S. PATENT DOCUMENTS

| | | | | |
|---|---|---|---|---|
| 5,925,120 | A | 7/1999 | Arp et al. | |
| 6,173,349 | B1 | 1/2001 | Qureshi et al. | |
| 6,957,290 | B1 | 10/2005 | Rowlands et al. | |
| 7,072,991 | B2 | 7/2006 | Takaku et al. | |
| 7,290,073 | B2 * | 10/2007 | Bee | G06F 13/4291 710/110 |
| 7,793,005 | B1 * | 9/2010 | Fernald | H02M 3/1584 323/222 |
| 7,979,597 | B2 * | 7/2011 | Deshpande | G06F 13/4291 710/14 |
| 8,543,740 | B2 * | 9/2013 | Lotzenburger | H04L 12/40006 710/10 |
| 2008/0162758 | A1 * | 7/2008 | Gideons | G06F 13/4291 710/110 |
| 2013/0174208 | A1 * | 7/2013 | Lee | H04N 21/4122 725/109 |

(Continued)

*Primary Examiner* — Christopher B Shin
(74) *Attorney, Agent, or Firm* — Loza & Loza LLP

(57) ABSTRACT

Systems, methods, and apparatus for communicating datagrams over a serial communication link are provided. A receiving device captures a sending device address during bus arbitration and receives a datagram subsequent to the bus arbitration. The datagram includes at least a register address and a payload. The receiving device obtains an address region specific to the sending device within a register space of the receiving device based on the captured sending device address and the register address included in the datagram and writes the payload of the datagram to the register space according to the obtained address region.

30 Claims, 19 Drawing Sheets

(56) References Cited

U.S. PATENT DOCUMENTS

2015/0120975 A1* 4/2015 Sengoku ............. G06F 13/4282 710/110
2015/0309960 A1* 10/2015 Pitigoi-Aron ....... G06F 13/4291 710/106
2017/0104655 A1* 4/2017 Takahashi ............. H04L 1/0063
2017/0255851 A1* 9/2017 Sinha ...................... H04W 4/21
2017/0286341 A1 10/2017 Takahashi et al.
2018/0246835 A1* 8/2018 Lu ........................... G06F 13/42
2018/0275990 A1* 9/2018 Peixoto Machado Da Silva ........ G06F 9/3005

* cited by examiner

BUS COMMUNICATION ENHANCEMENT BASED ON IDENTIFICATION CAPTURE DURING BUS ARBITRATION

CROSS-REFERENCE TO RELATED APPLICATIONS

This application claims priority to and the benefit of U.S. Provisional Patent Application No. 62/504,455, filed on May 10, 2017, titled "BUS COMMUNICATION ENHANCEMENT BASED ON IDENTIFICATION CAPTURE DURING BUS ARBITRATION", the entire contents of which is incorporated herein by reference.

TECHNICAL FIELD

The present disclosure relates generally to serial communication and, more particularly, to communicating datagrams over a serial communication link.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. General-purpose serial interfaces known in the industry include the Inter-Integrated Circuit (I2C or $I^2C$) serial bus and its derivatives and alternatives, including interfaces defined by the Mobile Industry Processor Interface (MIPI) Alliance, such as I3C and the Radio Frequency Front-End (RFFE) interface.

In one example, the I2C serial bus is a serial single-ended computer bus that was intended for use in connecting low-speed peripherals to a processor. Some interfaces provide multi-master buses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links.

In many instances, a number of command and control signals are employed to connect different component devices in mobile communication devices. These connections consume precious general-purpose input/output (GPIO) pins within the mobile communication devices and it would be desirable to replace the physical interconnects with signals carried in information transmitted over existing serial data links. However, the serial data links are associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support low-latency transmissions between peripherals and application processors.

SUMMARY

Certain aspects of the disclosure relate to systems, apparatus, methods and techniques that can communicate datagrams over a serial communication link such that all devices on the link are informed of which device wins a bus arbitration and sends a corresponding datagram, therefore allowing a datagram receiving device to create a register address offset to prevent unintentional overwriting of a register space location.

In various aspects of the disclosure, a method performed at a receiving device for receiving a datagram from a sending device (e.g., request-capable slave (RCS) or bus master) via a bus, includes capturing a sending device address during bus arbitration, receiving a datagram subsequent to the bus arbitration, the datagram including at least a register address and a payload, obtaining an address region specific to the sending device within a register space of the receiving device based on the captured sending device address and the register address included in the datagram, and writing the payload of the datagram to the register space according to the obtained address region.

In an aspect, the obtaining the address region includes obtaining a page address within the register space based on the captured sending device address, and obtaining a page location within the page address based on the register address included in the datagram. The writing the payload includes writing the payload of the datagram to the obtained page address and page location.

In a further aspect, the obtaining the page address includes concatenating the captured sending device address with a base-offset value. The captured sending device address has a length of 4-bits, the base-offset value has a length of 4-bits, and the page address has a length of 8-bits.

In another aspect, the page location is equivalent to the register address included in the datagram. The page location and the register address included in the datagram have a length of 8-bits.

In an aspect, the capturing the sending device address includes detecting a start of the bus arbitration, detecting the sending device winning the bus arbitration, capturing the sending device address based on the sending device winning the bus arbitration, and storing the sending device address in a buffer.

In a further aspect, the method further includes detecting that a bus ownership session of the sending device has ended, and releasing the sending device address when the bus ownership session of the sending device has ended.

In various aspects of the disclosure, a receiving device for receiving a datagram from a sending device (e.g., request-capable slave (RCS) or bus master) via a bus, includes a bus interface and a processing circuit. The processing circuit is configured to capture a sending device address during bus arbitration, receive a datagram subsequent to the bus arbitration, the datagram including at least a register address and a payload, obtain an address region specific to the sending device within a register space of the receiving device based on the captured sending device address and the register address included in the datagram, and write the payload of the datagram to the register space according to the obtained address region.

In various aspects of the disclosure, a receiving device for receiving a datagram from a sending device (e.g., request-capable slave (RCS) or bus master) via a bus, includes means for capturing a sending device address during bus arbitration, means for receiving a datagram subsequent to the bus arbitration, the datagram including at least a register address and a payload, means for obtaining an address region specific to the sending device within a register space of the receiving device based on the captured sending device address and the register address included in the datagram, means for writing the payload of the datagram to the register space according to the obtained address region, means for detecting that a bus ownership session of the sending device has ended, and means for releasing the sending device address when the bus ownership session of the sending device has ended.

In various aspects of the disclosure, a processor-readable storage medium having one or more instructions which, when executed by at least one processor or state machine of a processing circuit, cause the processing circuit to capture a sending device (e.g., request-capable slave (RCS) or bus master) address during bus arbitration, receive a datagram subsequent to the bus arbitration, the datagram including at least a register address and a payload, obtain an address region specific to the sending device within a register space of a receiving device based on the captured sending device address and the register address included in the datagram, and write the payload of the datagram to the register space according to the obtained address region.

DETAILED DESCRIPTION

Figure 1:
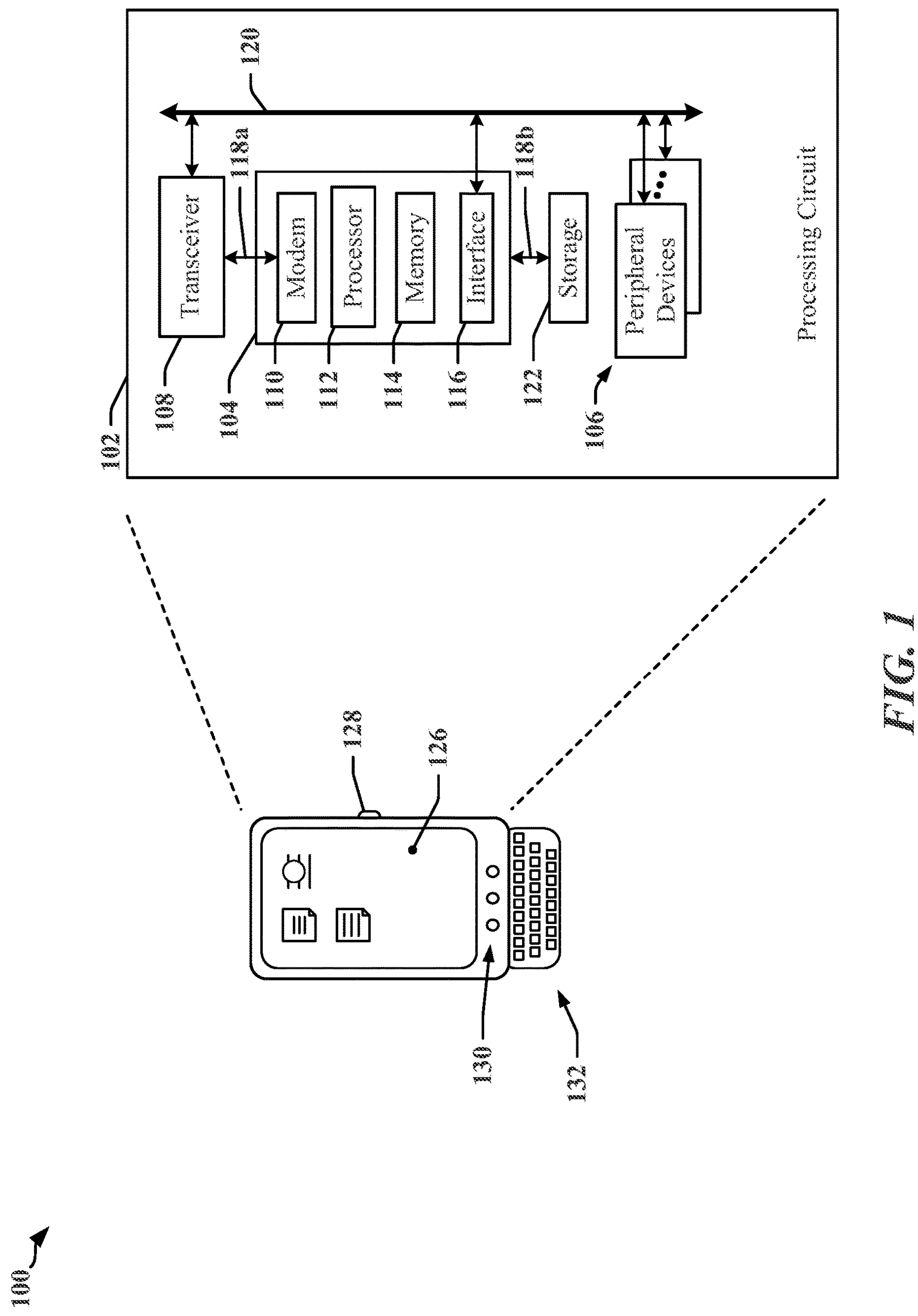
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance with I2C, I3C, and/or RFFE, protocols. According to certain aspects disclosed herein, GPIO pins and signals may be virtualized into GPIO state information that may be transmitted over a data communication link Virtualized GPIO state information may be transmitted over a variety of communication links, including links that include wired and wireless communication links. For example, virtualized GPIO state information can be packetized or otherwise formatted for transmission over wireless networks including Bluetooth, Wireless LAN, cellular networks, etc. Examples involving wired communication links are described herein to facilitate understanding of certain aspects.

A number of different protocol schemes may be used for communicating messaging and data over communication links Existing protocols have well-defined and immutable structures in the sense that their structures cannot be changed to optimize transmission latencies based on variations in use cases, and/or coexistence with other protocols, devices and applications. It is an imperative of real-time embedded systems that certain deadlines be met. In certain real-time applications, meeting transmission deadlines is of paramount importance. When a common bus supports different protocols it is generally difficult or impossible to guarantee optimal latency under all use cases. In some examples, an I2C, I3C or RFFE system power management interface (SPMI) serial communication bus may be used to tunnel different protocols with different latency requirements, different data transmission volumes, and/or different transmission schedules.

Certain aspects disclosed herein provide methods, circuits, and systems that are adapted to communicate datagrams on a bus such that all devices on the bus are informed of which device wins a bus arbitration and sends a corresponding datagram. The disclosed techniques allow a datagram receiving device to create a register address offset to prevent unintentional overwriting of a register space location.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106, and/or 108, which may be implemented in one or more application-specific integrated circuits (ASICs) or in a SoC. In one example, the apparatus 100 may be a communication device and the processing circuit 102 may include a processing device provided in an ASIC 104, one or more peripheral devices 106, and a transceiver 108 that enables the apparatus to communicate with a radio access network, a core access network, the Internet, and/or another network.

The ASIC 104 may have one or more processors 112, one or more modems 110, on-board memory 114, a bus interface circuit 116, and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as a display 126, operator controls, such as switches or buttons 128, 130, and/or an integrated or external keypad 132, among other components. A user interface module may be configured to operate with the display 126, keypad 132, etc. through a dedicated communication link or through one or more serial data interconnects.

The processing circuit 102 may provide one or more buses 118*a*, 118*b*, 120 that enable certain devices 104, 106, and/or 108 to communicate. In one example, the ASIC 104 may include a bus interface circuit 116 that includes a combination of circuits, counters, timers, control logic, and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
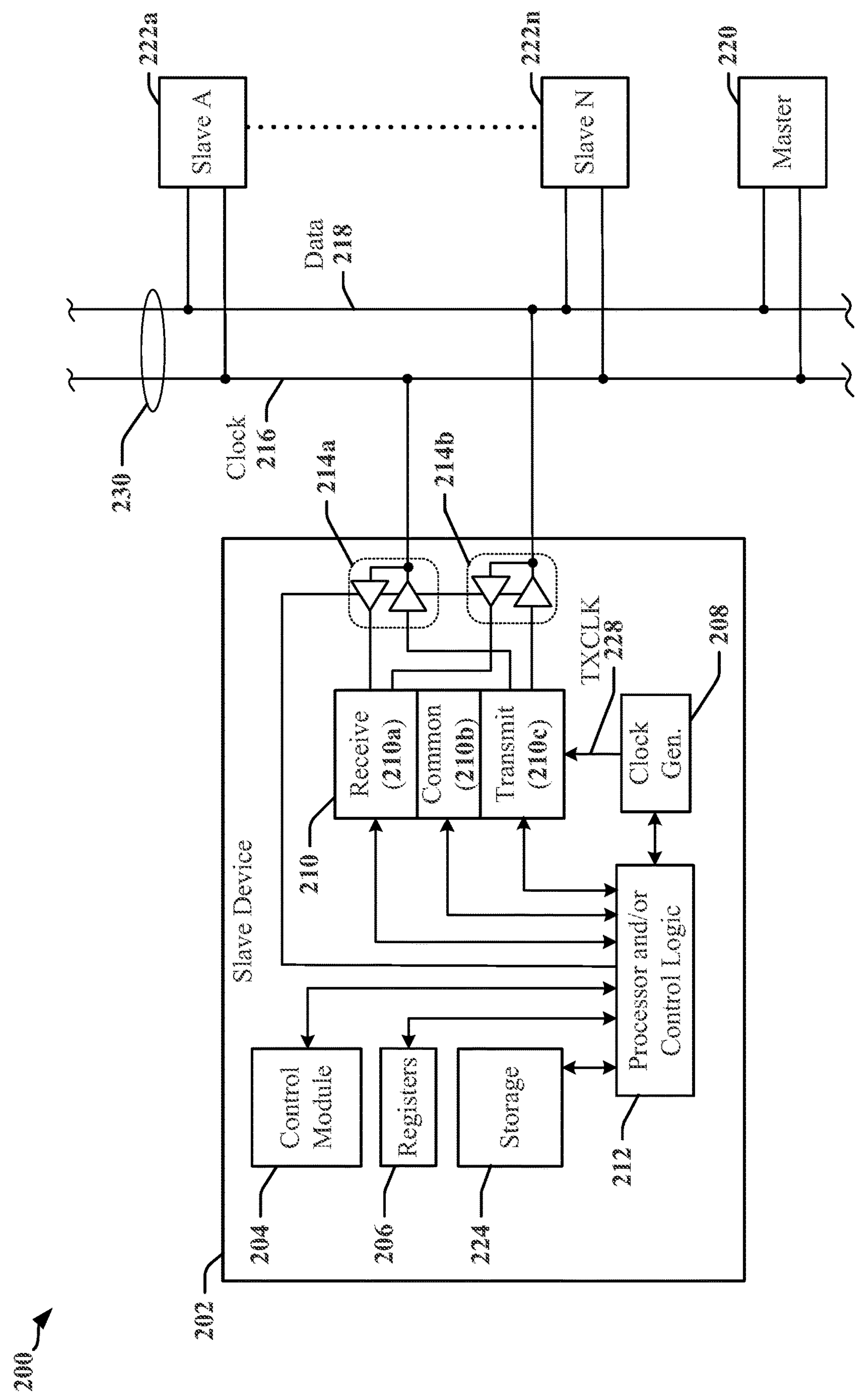
FIG. 2 illustrates a system architecture for an apparatus employing a data link between IC devices.

FIG. 2 illustrates certain aspects of an apparatus 200 that includes multiple devices 202, 220, and 222*a*-222*n* connected to a serial bus 230. The devices 202, 220, and 222*a*-222*n* may include one or more semiconductor IC devices, such as an applications processor, SoC or ASIC. Each of the devices 202, 220, and 222*a*-222*n* may include, support or operate as a modem, a signal processing device, a display driver, a camera, a user interface, a sensor, a sensor controller, a media player, a transceiver, and/or other such components or devices. Communications between devices 202, 220, and 222*a*-222*n* over the serial bus 230 are controlled by a bus master 220. Certain types of bus can support multiple bus masters 220.

The apparatus 200 may include multiple devices 202, 220, and 222*a*-222*n* that communicate when the serial bus 230 is operated in accordance with I2C, I3C, or other protocols. At least one device 202, 222*a*-222*n* may be configured to operate as a slave device on the serial bus 230. In one example, a slave device 202 may be adapted to provide a control function 204. In some examples, the control function 204 may include circuits and modules that support a display, an image sensor, and/or circuits and modules that control and communicate with one or more sensors that measure environmental conditions. The slave device 202 may include configuration registers 206 or other storage 224, control logic 212, a transceiver 210 and line drivers/receivers 214*a* and 214*b*. The control logic 212 may include a processing circuit such as a state machine, sequencer, signal processor, or general-purpose processor. The transceiver 210 may include a receiver 210*a*, a transmitter 210*c*, and common circuits 210*b*, including timing, logic, and storage circuits and/or devices. In one example, the transmitter 210*c* encodes and transmits data based on timing in one or more signals 228 provided by a clock generation circuit 208.

Two or more of the devices 202, 220, and/or 222*a*-222*n* may be adapted according to certain aspects and features disclosed herein to support a plurality of different communication protocols over a common bus, which may include an I2C, and/or I3C protocol. In some instances, devices that communicate using the I2C protocol can coexist on the same 2-wire interface with devices that communicate using I3C protocols. In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 megabits per second (Mbps). I2C and I3C protocols may define electrical and timing aspects for signals transmitted on the 2-wire serial bus 230, in addition to data formats and aspects of bus control. In some aspects, the I2C and I3C protocols may define direct current (DC) characteristics affecting certain signal levels associated with the serial bus 230, and/or alternating current (AC) characteristics affecting certain timing aspects of signals transmitted on the serial bus 230. In some examples, a 2-wire serial bus 230 transmits data on a first wire 218 and a clock signal on a second wire 216. In some instances, data may be encoded in the signaling state, or transitions in signaling state of the first wire 218 and the second wire 216.

Figure 3:
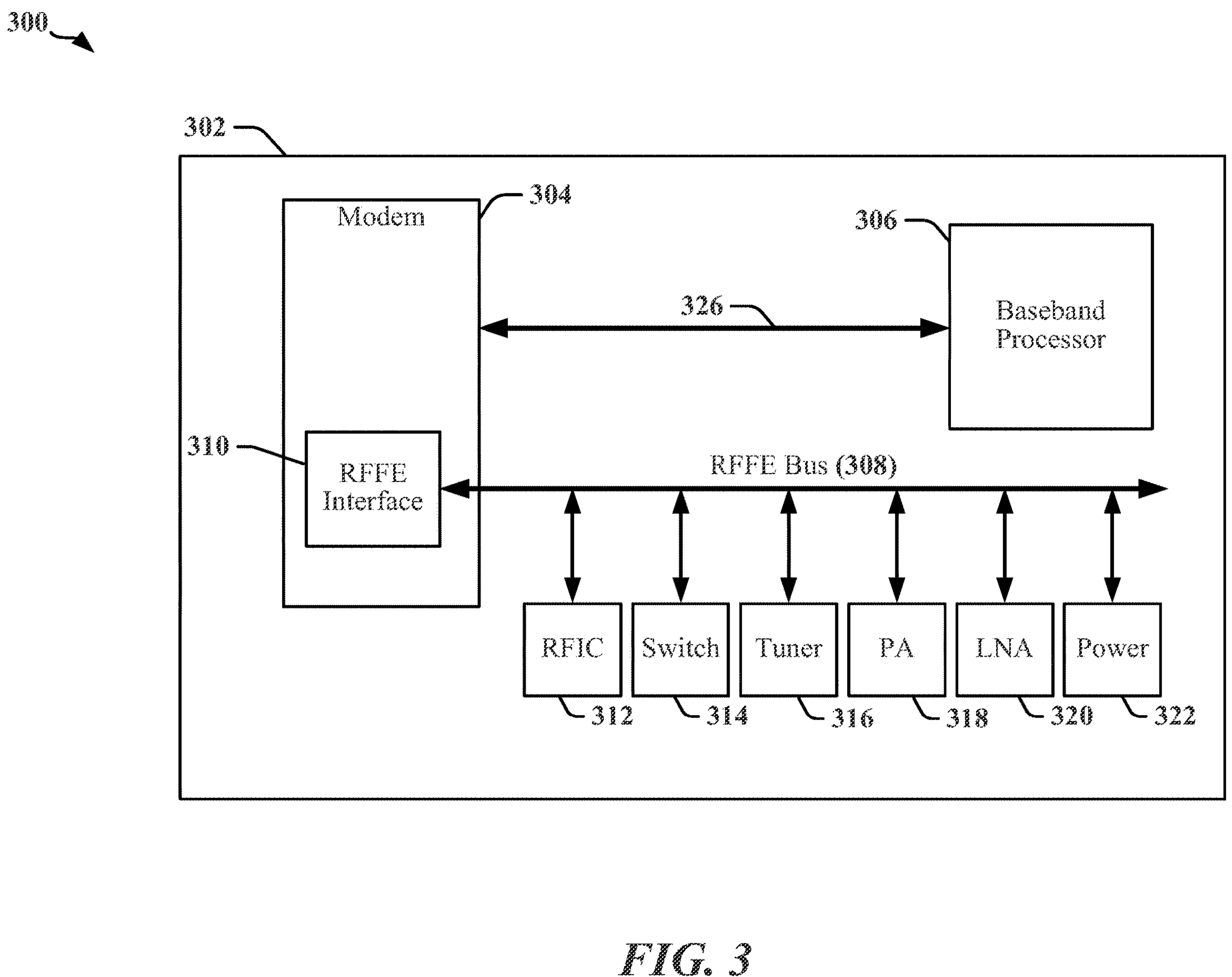
FIG. 3 illustrates a device that employs an RFFE bus to couple various radio frequency front-end devices.

FIG. 3 is a block diagram 300 illustrating an example of a device 302 that employs an RFFE, bus 308 to couple various front-end devices 312, 314, 316, 318, 320, 322. Although the device 302 will be described with respect to an RFFE interface, it is contemplated that the device 302 may also apply to a system power management interface (SPMI) and other multi-drop serial interfaces. A modem 304 may include an RFFE, interface 310 that couples the modem 304 to the RFFE bus 308. The modem 304 may communicate with a baseband processor 306. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the device 302 may be implemented with one or more baseband processors 306, modems 304, multiple communications links 308, 326, and various other buses, devices and/or different functionalities. In the example illustrated in FIG. 3, the RFFE bus 308 may be coupled to an RF integrated circuit (RFIC) 312, which may include one or more controllers, and/or processors that configure and control certain aspects of the RF front-end. The RFFE, bus 308 may couple the RFIC 312 to a switch 314, an RF tuner 316, a power amplifier (PA) 318, a low noise amplifier (LNA) 320, and a power management module 322.

Figure 4:
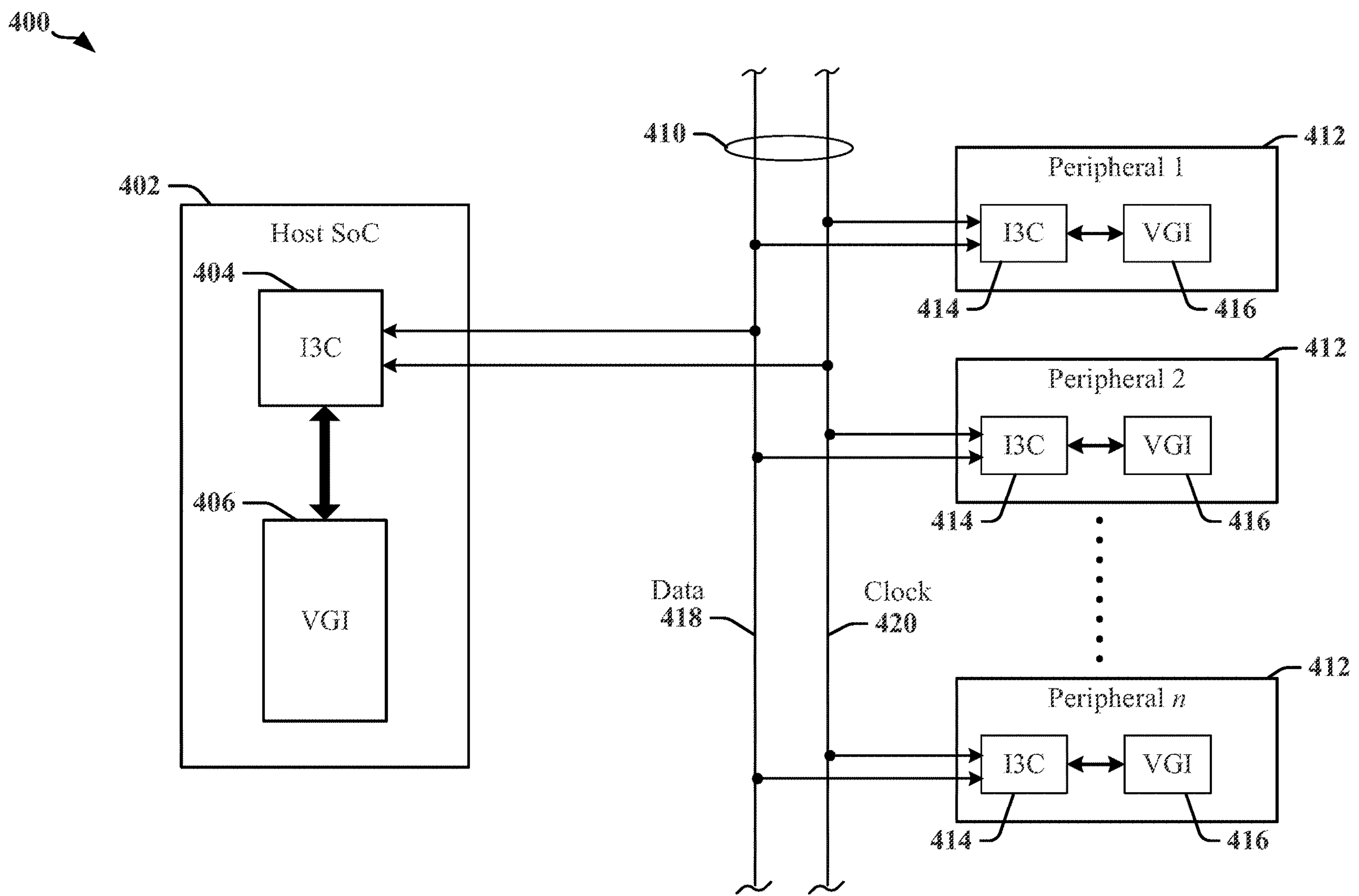
FIG. 4 illustrates a device that employs an I3C bus to couple various front-end devices in accordance with certain aspects disclosed herein.

FIG. 4 illustrates an example of an apparatus 400 that uses an I3C bus to couple various devices including a host SoC 402 and a number of peripheral devices 412. The host SoC 402 may include a virtual GPIO finite state machine (VGI FSM 406) and an I3C interface 404, where the I3C interface 404 cooperates with corresponding I3C interfaces 414 in the peripheral devices 412 to provide a communication link between the host SoC 402 and the peripheral devices 412. Each peripheral device 412 includes a VGI FSM 416. In the illustrated example, communications between the SoC 402 and a peripheral device 412 may be serialized and transmitted over a multi-wire serial bus 410 in accordance with an I3C protocol. In other examples, the host SoC 402 may include other types of interface, including I2C and/or RFFE interfaces. In other examples, the host SoC 402 may include a configurable interface that may be employed to communicate using I2C, I3C, RFFE and/or another suitable protocol. In some examples, a multi-wire serial bus 410, such as an I2C or I3C bus, may transmit a data signal over a data wire 418 and a clock signal over a clock wire 420.

Signaling Virtual GPIO Configuration Information

Figure 5:
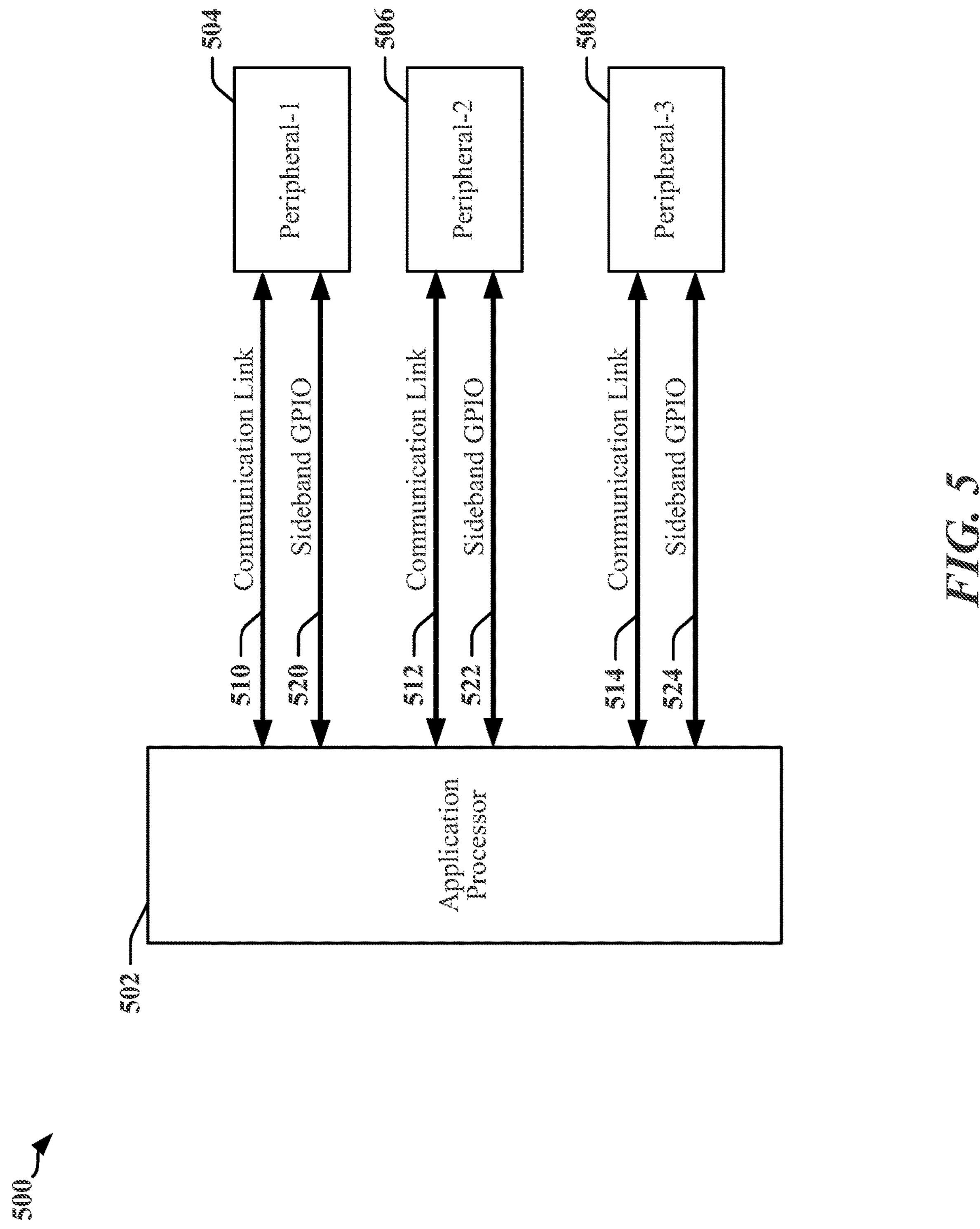
FIG. 5 illustrates an apparatus that includes an Application Processor and multiple peripheral devices that may be adapted according to certain aspects disclosed herein.

Mobile communication devices, and other devices that are related or connected to mobile communication devices, increasingly provide greater capabilities, performance and functionalities. In many instances, a mobile communication device incorporates multiple IC devices that are connected using a variety of communications links FIG. 5 illustrates an apparatus 500 that includes an Application Processor 502 and multiple peripheral devices 504, 506, 508. In the example, each peripheral device 504, 506, 508 communicates with the Application Processor 502 over a respective communication link 510, 512, 514 operated in accordance with mutually different protocols. Communication between the Application Processor 502 and each peripheral device 504, 506, 508 may involve additional wires that carry control or command signals between the Application Processor 502 and the peripheral devices 504, 506, 508. These additional wires may be referred to as sideband general purpose input/output (sideband GPIO 520, 522, 524), and in some instances the number of connections needed for sideband GPIO 520, 522, 524 can exceed the number of connections used for a communication link 510, 512, 514.

GPIO provides generic pins/connections that may be customized for particular applications. For example, a GPIO pin may be programmable to function as an output, input pin or a bidirectional pin, in accordance with application needs. In one example, the Application Processor 502 may assign and/or configure a number of GPIO pins to conduct handshake signaling or inter-processor communication (IPC) with a peripheral device 504, 506, 508 such as a modem. When handshake signaling is used, sideband signaling may be symmetric, where signaling is transmitted and received by the Application Processor 502 and a peripheral device 504, 506, 508. With increased device complexity, the increased number of GPIO pins used for IPC communication may significantly increase manufacturing cost and limit GPIO availability for other system-level peripheral interfaces.

According to certain aspects, the state of GPIO, including GPIO associated with a communication link, may be captured, serialized and transmitted over a data communication link In one example, captured GPIO may be transmitted in packets over an I3C bus using common command codes to indicate packet content and/or destination.

Figure 6:
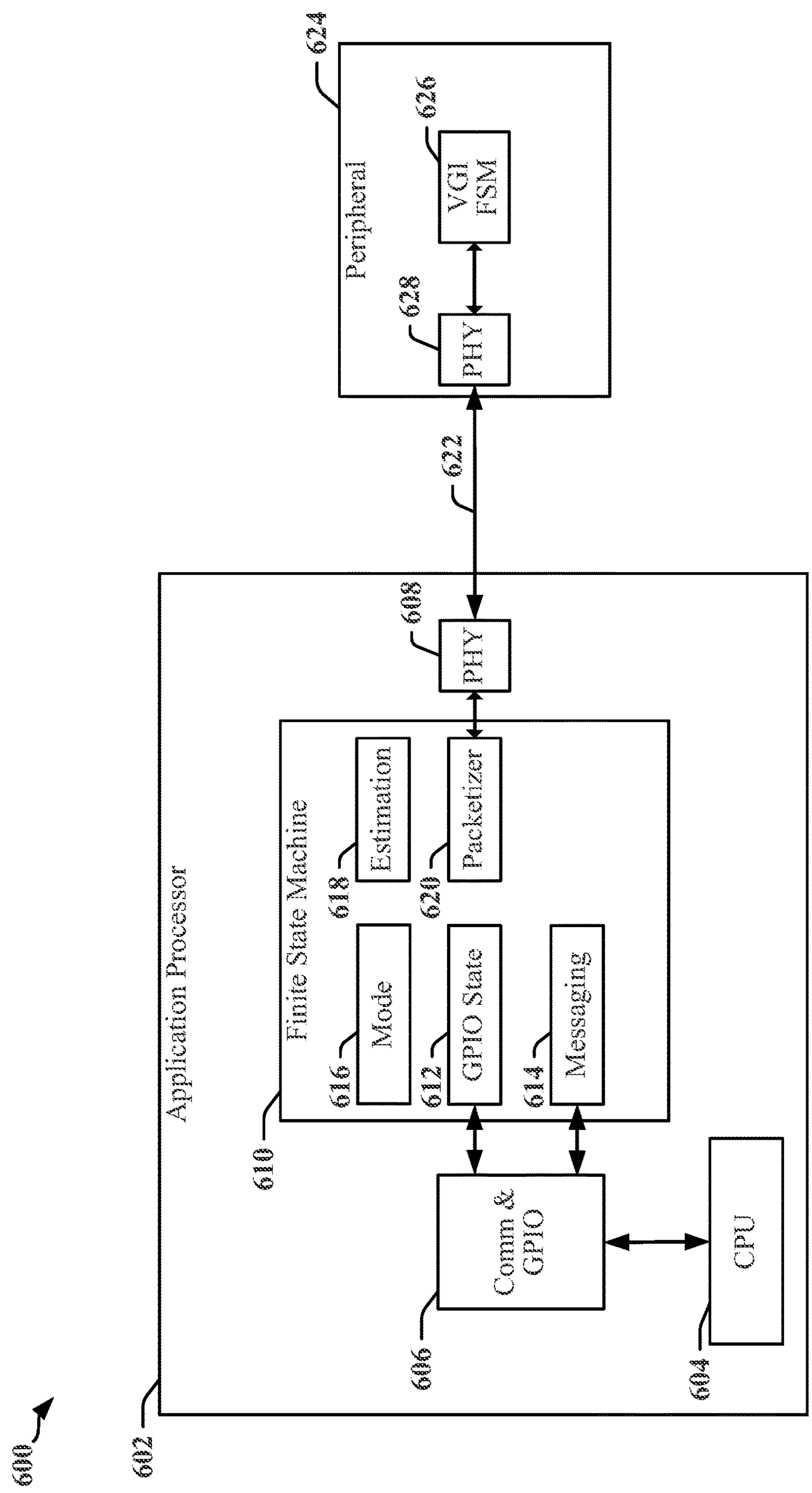
FIG. 6 illustrates an apparatus that has been adapted to support Virtual GPIO in accordance with certain aspects disclosed herein.

FIG. 6 illustrates an apparatus 600 that is adapted to support Virtual GPIO (VGI or VGMI) in accordance with certain aspects disclosed herein. VGI circuits and techniques can reduce the number of physical pins and connections used to connect an Application Processor 602 with a peripheral device 624. VGI enables a plurality of GPIO signals to be serialized into virtual GPIO signals that can be transmitted over a communication link 622. In one example, virtual GPIO signals may be encoded in packets that are transmitted over a communication link 622 that includes a multi-wire bus, including a serial bus. When the communication link 622 is provided as serial bus, the receiving peripheral device 624 may deserialize received packets and may extract messages and virtual GPIO signals. A VGI FSM 626 in the peripheral device 624 may convert the virtual GPIO signals to physical GPIO signals that can be presented at an internal GPIO interface.

In another example, the communication link 622 may be a provided by a transceiver that supports communication using, for example, a Bluetooth protocol, a wireless local area network (WLAN) protocol, a cellular wide area network, and/or another communication protocol. Messages and virtual GPIO signals may be encoded in packets, frames, subframes, or other structures that can be transmitted over the communication link 622, and the receiving peripheral device 624 may extract, deserialize and otherwise process received signaling to obtain the messages and virtual GPIO signals. Upon receipt of messages and/or virtual GPIO signals, the VGI FSM 626 or another component of the receiving device may interrupt its host processor to indicate receipt of messages and/or any changes in in GPIO signals.

In an example in which the communication link 622 is provided as a serial bus, messages and/or virtual GPIO signals may be transmitted in packets configured for an I2C, I3C, RFFE, or another standardized serial interface. In the illustrated example, VGI techniques are employed to accommodate I/O bridging between an Application Processor 602 and a peripheral device 624. The Application Processor 602 may be implemented as an ASIC, SoC, or some combination of devices. The Application Processor 602 includes a processor (central processing unit or CPU 604) that generates messages and GPIO associated with one or more communications channels 606. GPIO signals and messages produced by the communications channels 606 may be monitored by respective monitoring circuits 612, 614 in a VGI FSM 626. In some examples, a GPIO monitoring circuit 612 may be adapted to produce virtual GPIO signals representative of the state of physical GPIO signals and/or changes in the state of the physical GPIO signals. In some examples, other circuits are provided to produce the virtual GPIO signals representative of the state of physical GPIO signals and/or changes in the state of the physical GPIO signals.

An estimation circuit 618 may be configured to estimate latency information for the GPIO signals and messages, and may select a protocol, and/or a mode of communication for the communication link 622 that optimizes the latency for encoding and transmitting the GPIO signals and messages. The estimation circuit 618 may maintain protocol and mode information 616 that characterizes certain aspects of the communication link 622 to be considered when selecting the protocol, and/or a mode of communication. The estimation circuit 618 may be further configured to select a packet type for encoding and transmitting the GPIO signals and messages. The estimation circuit 618 may provide configuration information used by a packetizer 620 to encode the GPIO signals and messages. In one example, the configuration information is provided as a command that may be encapsulated in a packet such that the type of packet can be determined at a receiver. The configuration information, which may be a command, may also be provided to physical layer circuits (PHY 608). The PHY 608 may use the configuration information to select a protocol and/or mode of communication for transmitting the associated packet. The PHY 608 may then generate the appropriate signaling to transmit the packet.

The peripheral device 624 may include a VGI FSM 626 that may be configured to process data packets received from the communication link 622. The VGI FSM 626 at the peripheral device 624 may extract messages and may map bit positions in virtual GPIO signals onto physical GPIO pins in the peripheral device 624. In certain embodiments, the communication link 622 is bidirectional, and both the Application Processor 602 and a peripheral device 624 may operate as both transmitter and receiver.

The PHY 608 in the Application Processor 602 and a corresponding PHY 628 in the peripheral device 624 may be configured to establish and operate the communication link 622. The PHY 608 and 628 may be coupled to, or include a transceiver 108 (see FIG. 1). In some examples, the PHY 608 and 628 may support a two-wire interface such as an I2C, I3C, RFFE, or SMBus interface at the Application Processor 602 and peripheral device 624, respectively, and virtual GPIO signals and messages may be encapsulated into a packet transmitted over the communication link 622, which may be a multi-wire serial bus or multi-wire parallel bus for example.

VGI tunneling, as described herein, can be implemented using existing or available protocols configured for operating the communication link 622, and without the full complement of physical GPIO pins. VGI FSMs 610, 626 may handle GPIO signaling without intervention of a processor in the Application Processor 602 and/or in the peripheral device 624. The use of VGI can reduce pin count, power consumption, and latency associated with the communication link 622.

At the receiving device virtual GPIO signals are converted into physical GPIO signals. Certain characteristics of the physical GPIO pins may be configured using the virtual GPIO signals. For example, slew rate, polarity, drive strength, and other related parameters and attributes of the physical GPIO pins may be configured using the virtual GPIO signals. Configuration parameters used to configure the physical GPIO pins may be stored in configuration registers associated with corresponding GPIO pins. These configuration parameters can be addressed using a proprietary or conventional protocol such as I2C, I3C or RFFE. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

The VGI interface enables transmission of messages and virtual GPIO signals, whereby virtual GPIO signals, messages, or both can be sent in the serial data stream over a wired or wireless communication link 622. In one example, a serial data stream may be transmitted in packets and/or as a sequence of transactions over an I2C, I3C, or RFFE bus. The presence of virtual GPIO data in I2C/I3C frame may be signaled using a special command code to identify the frame as a VGPIO frame. VGPIO frames may be transmitted as broadcast frames or addressed frames in accordance with an I2C or I3C protocol. In some implementations, a serial data stream may be transmitted in a form that resembles a universal asynchronous receiver/transmitter (UART) signaling and messaging protocol, in what may be referred to as UART_VGI mode of operation. This may also be referred to as a VGI messaging interface or VGMI.

Figure 7:
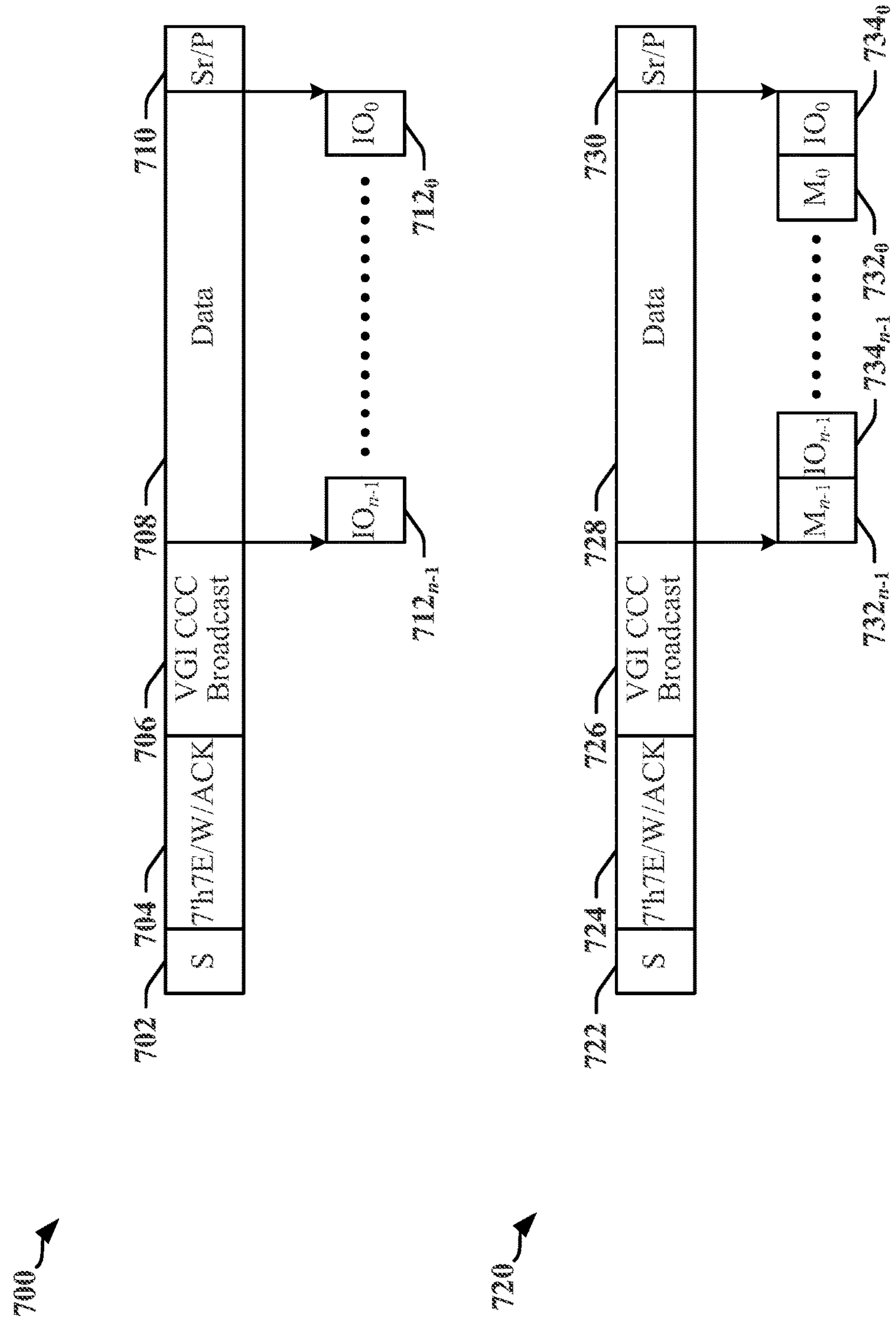
FIG. 7 illustrates examples of VGI broadcast frames according to certain aspects disclosed herein.

FIG. 7 illustrates examples of VGI broadcast frames 700, 720. In a first example, a broadcast frame 700 commences with a start bit 702 (S) followed by a header 704 in accordance with an I2C or I3C protocol. A VGI broadcast frame may be identified using a VGI broadcast common command code 706. A VGPIO data payload 708 includes a number (n) of virtual GPIO signals $\mathbf{712}_0$-$\mathbf{712}_{n-1}$, ranging from a first virtual GPIO signal $\mathbf{712}_0$ to an nth virtual GPIO signal $\mathbf{712}_{n-1}$. A VGI FSM may include a mapping table that maps bit positions of virtual GPIO signals in a VGPIO data payload 708 to conventional GPIO pins. The virtual nature of the signaling in the VGPIO data payload 708 can be transparent to processors in the transmitting and receiving devices.

In the second example, a masked VGI broadcast frame 720 may be transmitted by a host device to change the state of one or more GPIO pins without disturbing the state of other GPIO pins. In this example, the I/O signals for one or more devices are masked, while the I/O signals in a targeted device are unmasked. The masked VGI broadcast frame 720 commences with a start bit 722 followed by a header 724. A masked VGI broadcast frame 720 may be identified using a masked VGI broadcast common command code 726. The VGPIO data payload 728 may include I/O signal values $\mathbf{734}_0$-$\mathbf{734}_{n-1}$ and corresponding mask bits $\mathbf{732}_0$-$\mathbf{732}_{n-1}$, ranging from a first mask bit $M_0$ 732$_0$ for the first I/O signal ($IO_0$) to an nth mask bit $M_{n-1}$7$32_{n-1}$ for the nth I/O signal $IO_{n-1}$.

A stop bit or synchronization bit (Sr/P 710, 730) terminates the broadcast frame 700, 720. A synchronization bit may be transmitted to indicate that an additional VGPIO payload is to be transmitted. In one example, the synchronization bit may be a repeated start bit in an I2C interface.

Figure 8:
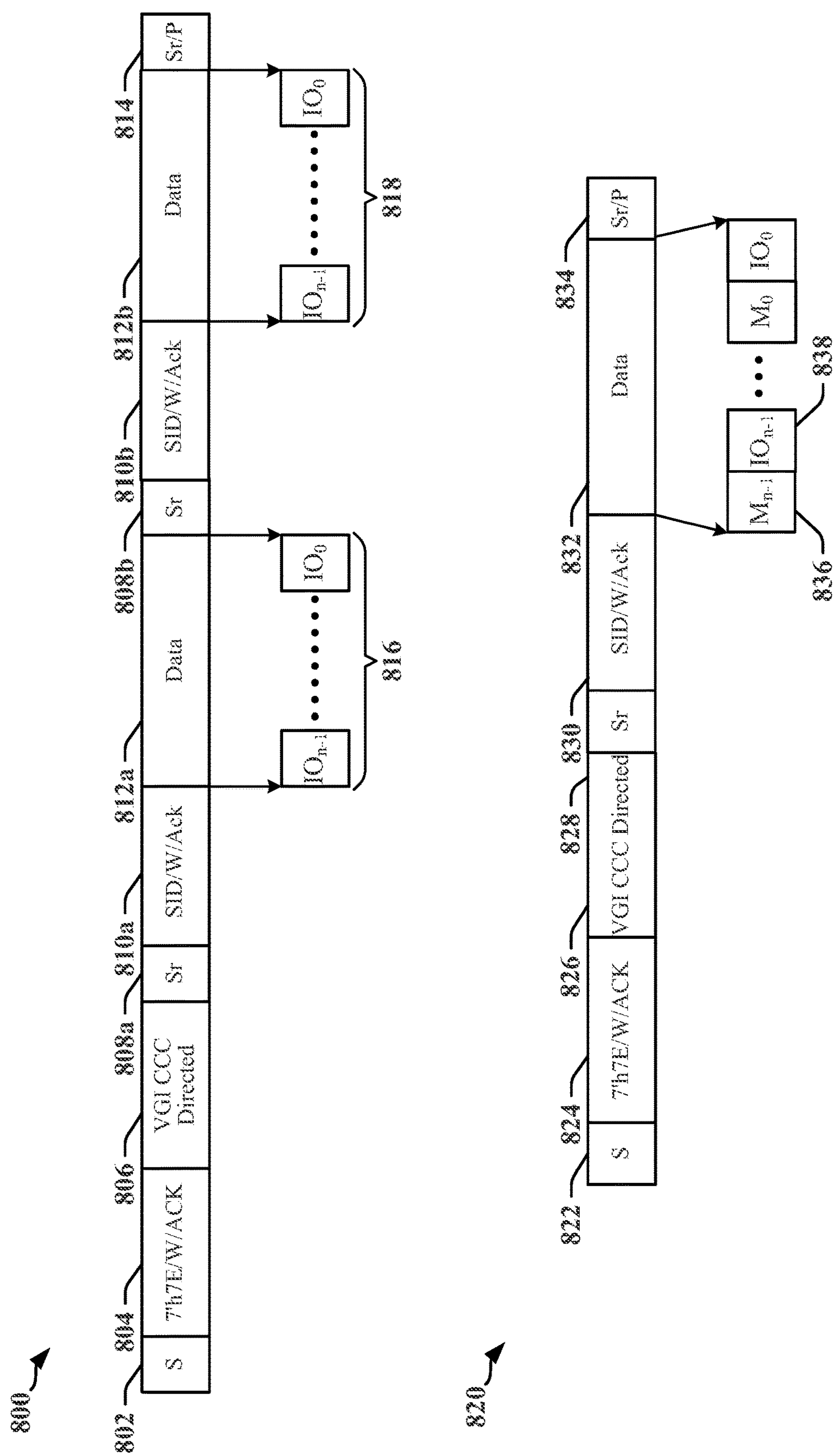
FIG. 8 illustrates examples of VGI directed frames according to certain aspects disclosed herein.

FIG. 8 illustrates examples of VGI directed frames 800, 820. In a first example, VGI directed frames 800 may be addressed to a single peripheral device or, in some instances, to a group of peripheral devices. The first of the VGI directed frames 800 commences with a start bit 802 (S) followed by a header 804 in accordance with an I2C or I3C protocol. A VGI directed frame 800 may be identified using a VGI directed common command code 806. The directed common command code 806 may be followed by a synchronization field 808*a* (Sr) and an address field 810*a* that includes a slave identifier to select the addressed device. The directed VGPIO data payload 812*a* that follows the address field 810*a* includes values 816 for a set of I/O signals that pertain to the addressed device. VGI directed frames 800 can include additional directed payloads 812*b* for additional devices. For example, the first directed VGPIO data payload 812*a* may be followed by a synchronization field 808*b* and a second address field 810*b*. In this example, the second directed VGPIO payload 812*b* includes values 818 for a set of I/O signals that pertain to a second addressed device. The use of VGI directed frames 800 may permit transmission of values for a subset or portion of the I/O signals carried in a broadcast VGPIO frame 700, 720.

In the second example, a masked VGI directed frame 820 may be transmitted by a host device to change the state of one or more GPIO pins without disturbing the state of other GPIO pins in a single peripheral device and without affecting other peripheral devices. In some examples, the I/O signals in one or more devices may be masked, while selected I/O signals in one or more targeted device are unmasked. The masked VGI directed frame 820 commences with a start bit 822 followed by a header 824. A masked VGI directed frame 820 may be identified using a masked VGI directed common command code 826. The masked VGI directed command code 826 may be followed by a synchronization field 828 (Sr) and an address field 830 that includes a slave identifier to select the addressed device. The directed payload 832 that follows includes VGPIO values for a set of I/O signals that pertain to the addressed device. For example, the VGPIO values in the directed data payload 832 may include I/O signal values 838 and corresponding mask bits 836.

A stop bit or synchronization bit (Sr/P 814, 834) terminates the VGI directed frames 800, 820. A synchronization bit may be transmitted to indicate that an additional VGPIO payload is to be transmitted. In one example, the synchronization bit may be a repeated start bit in an I2C interface.

Figure 9:
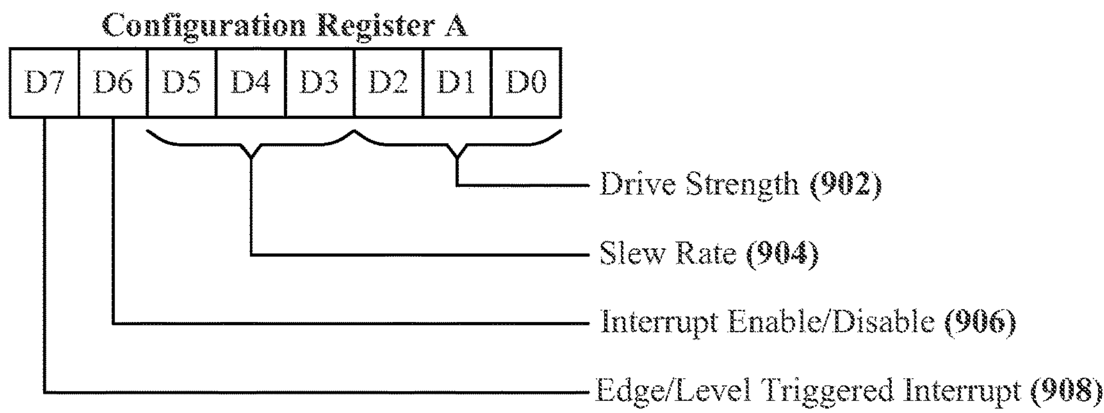
FIG. 9 illustrates configuration registers that may be associated with a physical pin according to certain aspects disclosed herein.
Figure 9:
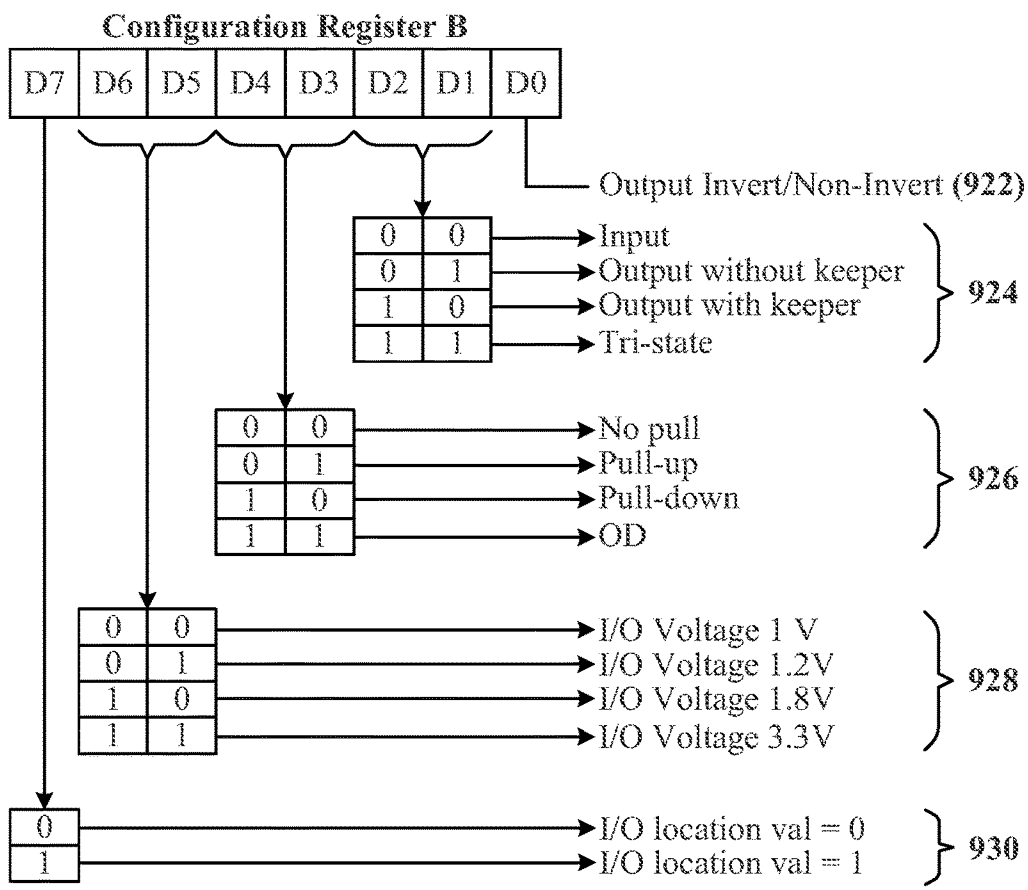

At the receiving device (e.g., the Application Processor 502 and/or peripheral device 504, 506, 508), received virtual GPIO signals are expanded into physical GPIO signal states presented on GPIO pins. The term “pin,” as used herein, may refer to a physical structure such as a pad, pin or other interconnecting element used to couple an IC to a wire, trace, through-hole via, or other suitable physical connector provided on a circuit board, substrate or the like. Each GPIO pin may be associated with one or more configuration registers that store configuration parameters for the GPIO pin. FIG. 9 illustrates configuration registers 900 and 920 that may be associated with a physical pin. Each configuration register 900, 920 is implemented as a one-byte (8 bits) register, where different bits or groups of bits define a characteristic or other features that can be controlled through configuration. In a first example, bits D0-D2 902 control the drive strength for the GPIO pin, bits D3-D5 904 control the slew rate for GPIO pin, bit D6 906 enables interrupts, and bit D7 908 determines whether interrupts are edge-triggered or triggered by voltage-level. In a second example, bit D0 922 selects whether the GPIO pin receives an inverted or non-inverted signal, bits D1-D2 924 define a type of input or output pin, bits D3-D4 926 defines certain characteristics of an undriven pin, bits D5-D6 928 define voltage levels for signaling states, and bit D7 930 controls the binary value for the GPIO pin (i.e., whether GPIO pin carries carry a binary one or zero).

Consolidating GPIO for Multiple Devices or Communication Links

Figure 10:
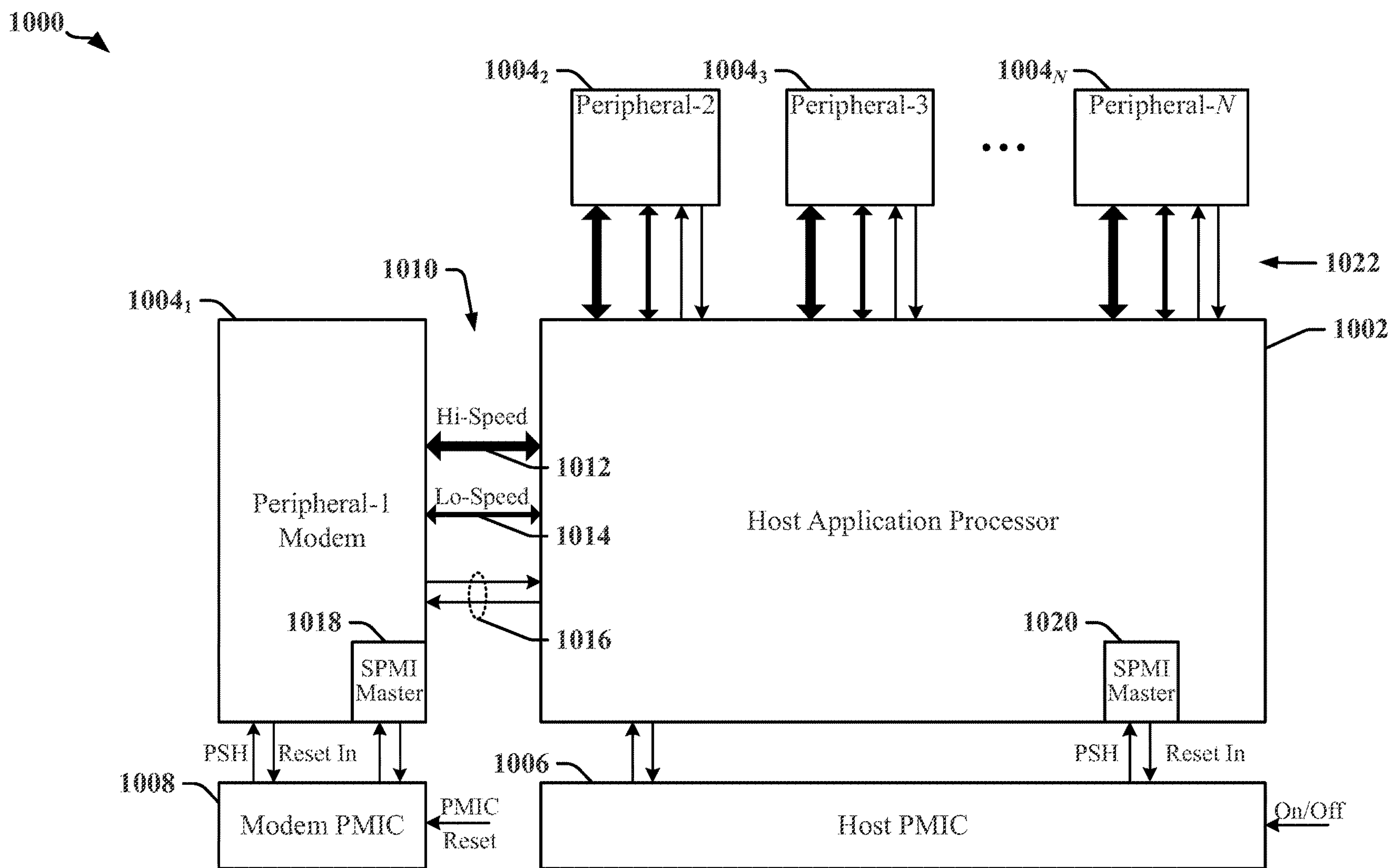
FIG. 10 illustrates an example of a system which includes one or more communication links that employ sideband GPIO.

FIG. 10 illustrates an example of a system 1000 which includes one or more communication links that employ sideband GPIO and that may not easily be serialized and transmitted in a single serial link In some examples, there may be an impediment to transmitting sideband GPIO over a single parallel data communication link. To facilitate description, the example of a serial data link may be employed, although the concepts described herein may be applied to parallel data communication links. The system 1000 may include an application processor 1002 that may serve as a host device on various communication links, multiple peripherals 1004$_1$-1004$_N$, and one or more power management integrated circuits (PMICs 1006, 1008). In the illustrated system 1000, at least a first peripheral 1004$_1$ may include a modem. The application processor 1002 and the first peripheral 1004$_1$ may be coupled to respective PMICs 1006, 1008 using GPIO that provides a combination of reset and other signals, and a system power management interface (SPMI 1018, 1020). The SPMI 1018, 1020 operates as a serial interface defined by the MIPI Alliance that is optimized for the real-time control of devices including PMICs 1006, 1008. The SPMI 1018, 1020 may be configured as a shared bus that provides high-speed, low-latency connection for devices, where data transmissions may be managed, according to priorities assigned to different traffic classes.

The application processor 1002 may be coupled to each of the peripherals 1004$_1$-1004$_N$ using multiple communication links 1012, 1014 and GPIO 1016. For example, the application processor 1002 may be coupled to the first peripheral 1004$_1$ using a high-speed bus 1012, a low-speed bus 1014, and input and/or output GPIO 1016. As disclosed herein, GPIO signals may be virtualized and transferred over certain serial interfaces, such as the I3C interface. The transfer of the GPIO signals is facilitated using common command code protocols available in I3C interfaces that may not be available in other types of interface. Accordingly, the virtualization of GPIO may be rendered difficult or impractical when certain high speed communication links are used to couple the application processor 1002 and the peripherals 1004$_1$-1004$_N$.

Figure 11:
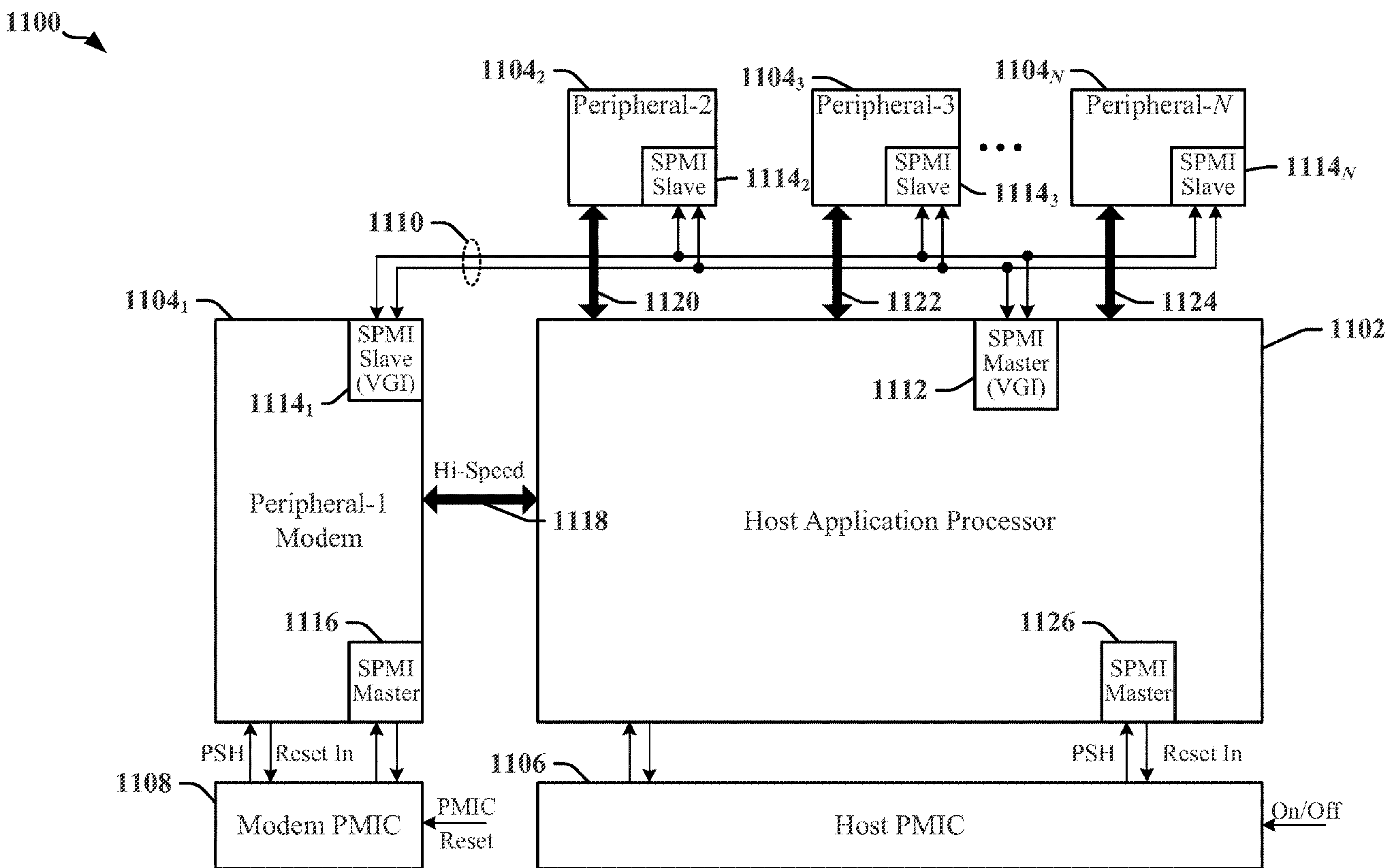
FIG. 11 illustrates an example of a system which virtualizes and consolidates communication of GPIO state associated with multiple devices and/or communication links using a single serial communication link in accordance with certain aspects disclosed herein.

According to certain aspects disclosed herein, GPIO may be consolidated for multiple communication links and devices. FIG. 11 illustrates an example of a system 1100 which virtualizes and consolidates communication of GPIO state associated with multiple devices and/or communication links using a single serial communication link. In the illustrated example, a multi-drop serial bus 1110 operated in accordance with SPMI protocols may be used to carry GPIO state information for multiple devices, including for example an application processor 1102 and multiple peripherals 1104$_1$-1104$_N$. State information for sideband GPIO associated with each high-speed serial link 1118, 1120, 1122, 1124 and other GPIO coupling the application processor 1102 to one or more of the peripherals $\mathbf{1104}_1$-$\mathbf{1104}_N$ may be transmitted as VGI over the serial bus 1110. In one example, the application processor 1102 may include an SPMI master 1112 and each of the peripherals $\mathbf{1104}_1$-$\mathbf{1104}_N$ may include SPMI slaves $\mathbf{1104}_1$-$\mathbf{1104}_N$ that may be used exclusively for exchange of VGI. In another example, the serial bus 1110 may be used for transferring data and commands unrelated to VGI, in addition to VGI.

The system 1100 may include an application processor 1102 that may serve as a host device on various communication links, including the serial bus 1110. One or more power management integrated circuits (PMICs 1106, 1108) may be included in the system 1100. In the illustrated system 1100, at least a first peripheral $\mathbf{1104}_1$ may include a modem.

Virtualizing GPIO can result in a reduced number of input/output pins, reduce IC package size, and reduces printed circuit board routing complexity. The serial bus 1110 may be operated in accordance with SPMI protocols. In some examples, other protocols may be used for transferring VGI at high speed, and with low latency. In one example the RFFE bus may be employed for communicating VGI. As disclosed herein, GPIO signals may be virtualized and transferred over the serial bus 1110. The transfer of the GPIO signals may be accomplished without modifying the protocols used on the serial bus 1110. In some examples, GPIO consolidation may be implemented using a state machine to control virtualization of GPIO. In many examples, no modification of communication protocol is required. For example, additions, modifications and/or deletions of protocol-defined command and/or common command codes are not required to control GPIO state transmission.

According to certain aspects, multiple GPIO ports can be virtualized such that the GPIO state information transmitted over the serial bus 1110 may relate to consolidated state for multiple GPIO ports. In one example, multiple GPIOs may be supported for each port. The state machine may be configured to automatically identify when GPIO state information should be transmitted, and to which devices 1102, $\mathbf{1104}_1$-$\mathbf{1104}_N$ the GPIO state information should be addressed. In some examples, state information related to one output GPIO may be transmitted and/or routed by the application processor 1102 (for example) to modify input GPIO of two or more of the peripherals $\mathbf{1104}_1$-$\mathbf{1104}_N$.

In some instances, the state machine may be adapted to implement automatic bit-level masking to minimize software complexity and overhead and transmission latency. In some examples, a second level GPIO cross-bar multiplexer/demultiplexer scheme may be employed to enable routing to all possible routing destinations and combinations of routing destinations. GPIO state information may be transmitted to a targeted peripheral $\mathbf{1104}_1$-$\mathbf{1104}_N$ or to a group of peripherals $\mathbf{1104}_1$-$\mathbf{1104}_N$. A configurable priority scheme may be implemented to select between GPIO state transmissions and messaging transmissions.

Examples of GPIO State Consolidation

Figure 12:
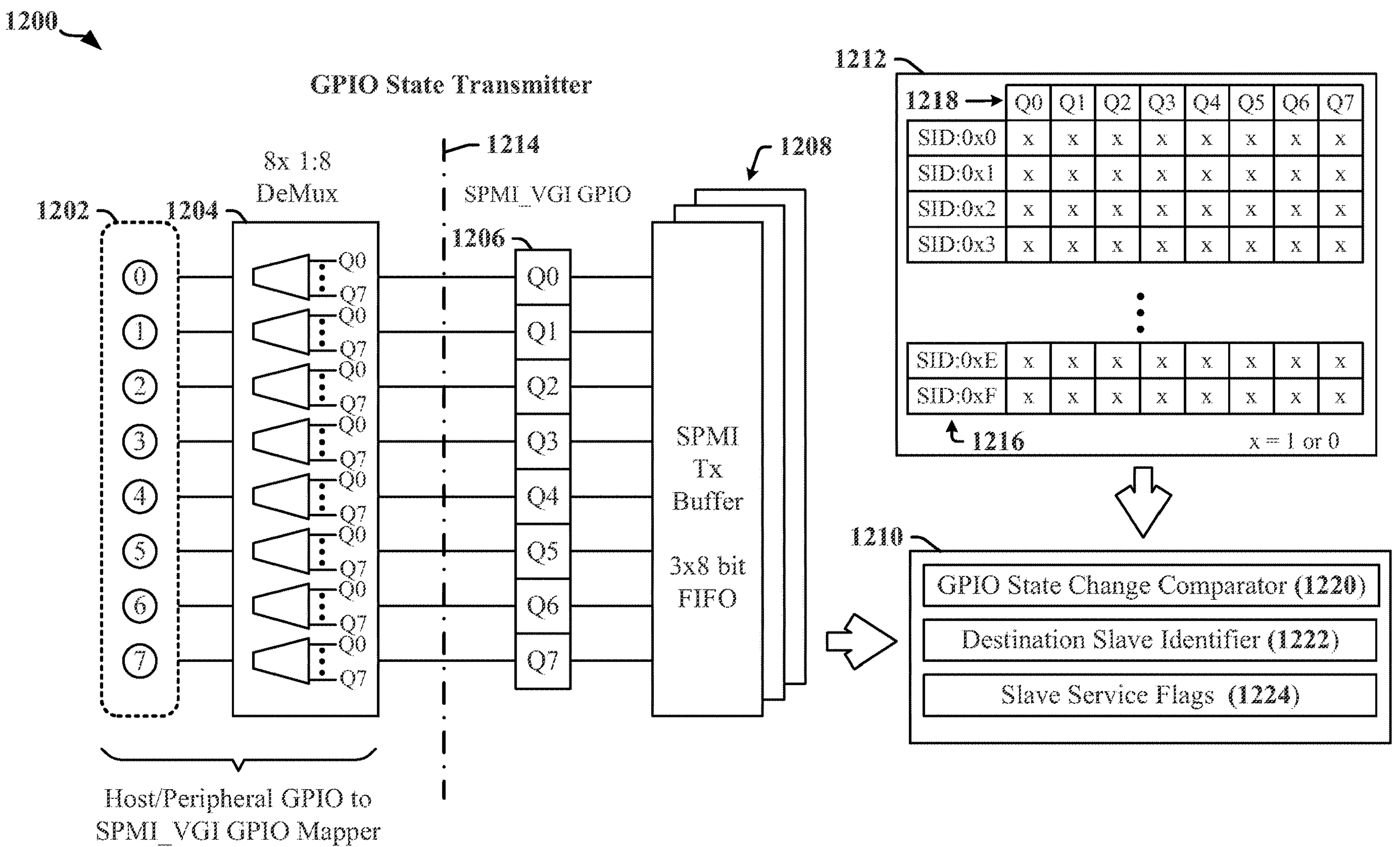
FIG. 12 is a flow diagram that illustrates operation of a GPIO state transmitter adapted in accordance with certain aspects disclosed herein.

FIG. 12 is a flow diagram 1200 that illustrates operation of a GPIO state transmitter. The flow diagram 1200 relates to an example of a host device that consolidates and transmits GPIO state information corresponding to a set of GPIOs. The set of GPIOs may include host or peripheral GPIOs 1202 which can be consolidated in SPMI_VGI GPIOs 1206. In some examples, these GPIOs 1202 are included in a unified GPIO map maintained by the host or peripheral device. Use of GPIOs 1202 derived from the unified GPIO map permits software transparency. In other words, the underlying software using these GPIOs 1202 does not require any change based on the usage of these GPIOs 1202 for generating SPMI_VGI GPIOs 1206.

Groups of 8 GPIOs 1202 may be consolidated for producing SPMI_VGI GPIOs 1206. Each group of 8 GPIOs 1202 to be consolidated over SPMI_VGI GPIOs 1206 may configured using a 1-to-8 de-multiplexer 1204. The de-multiplexer 1204 enables mapping of the system or peripheral GPIOs to SPMI_VGI GPIOs 1206. All possible mappings of GPIOs to SPMI_VGI GPIOs 1206 are enabled by the de-multiplexer 1204. In one example, a 1:1 mapping may be used for host/peripheral GPIO to SPMI GPIO mapping. Each de-multiplexer 1204 may be controlled using 4 control bits, where 3 bits (e.g., bits [D2:D0]) configure the de-multiplexer 1204 and the fourth bit (e.g., bit D4) may be used to enable or disable the de-multiplexer 1204. SPMI_VGI GPIOs 1206 produced by the de-multiplexer 1204 represent the GPIO states that are transmitted in SPMI_VGI.

In some examples, soft GPIOs may be employed, where the configuration (Q0 to Q7) of SPMI_VGI GPIOs 1206 may be set programmatically. In this type implementation, host/peripheral GPIO 1202 and de-multiplexer 1204 blocks are not required. The dashed 1214 line illustrates a possible partitioning when the configuration of the SPMI_VGI GPIOs 1206 is set programmatically.

A transmit buffer 1208 may be used to store GPIO state changes while a previous state change is communicated. The transmit buffer 1208 may be implemented or configured to operate as a FIFO. In the illustrated example, the FIFO has a depth of at least three storage locations. The transmit buffer 1208 may be configured to accommodate any GPIO state changes that may occur happen previous state change information is in the transmit phase.

A slave association map 1212 may be provided. The slave association map 1212 may be indexed or ordered by slave identifier (SIDs 1216). The slave association map 1212 establishes the association of each available or possible slave with the output GPIO bits 1218. In one example, the slaves may include 16 slave devices having identifiers in the range SID=0x0 to SID=0xF. More than one slave may be associated with a given GPIO bit 1218, such that configurational equivalence of a single output GPIO bit 1218 connected to multiple peripherals may be provided as needed by a system design. In the example, each bit location can have the value '1' or '0' where '1' indicates an association between a SID 1216 and an output GPIO bit 1218, while a '0' indicates no association between a SID 1216 and an output GPIO bit 1218. In one example, a maximum of 16 slaves may be supported on the bus, and the slave association map 1212 requires 16-bytes of register space for each group of 8 output GPIO bits 1218. In other examples, the bus may support more than 16 slave devices, and the slave association map 1212 may be provisioned with register space sufficient to map the number of expected or possible slave devices.

In an example where the host is configured to support 16 slave devices and provide up to 16 bytes for configuring output GPIO bits 1218, the slave association map 1212 on the host side requires 16*16=256 bytes. Each slave, however, need support only 8 output GPIO bits and hence the slave association map on the slave side use only 16 bytes.

A transmit logic unit 1210 may be provided to send GPIO state information in accordance with standard SPMI protocols. The transmit logic unit 1210 may include certain modules and/or circuits including a GPIO state change comparator 1220, a destination slave identifier module 1222, and a slave service flags module 1224.

The GPIO state change comparator 1220 performs a bit level comparison between the last transmitted GPIO state and the GPIO state that is currently ready in the transmit buffer for transmission. A change at one or more bit location acts as trigger for GPIO state transmission.

The destination slave identifier module 1222 accesses the slave association map 1212 to determine which GPIO bits have changed, and to identify which slave or slaves are the destination for transmission of the GPIO state.

The slave service flags module 1224 may operate as a slave service tracker. When slaves have been identified by the destination slave identifier module 1222, corresponding flags are marked as active. The flags are cleared when all the slaves have been served.

Figure 13:
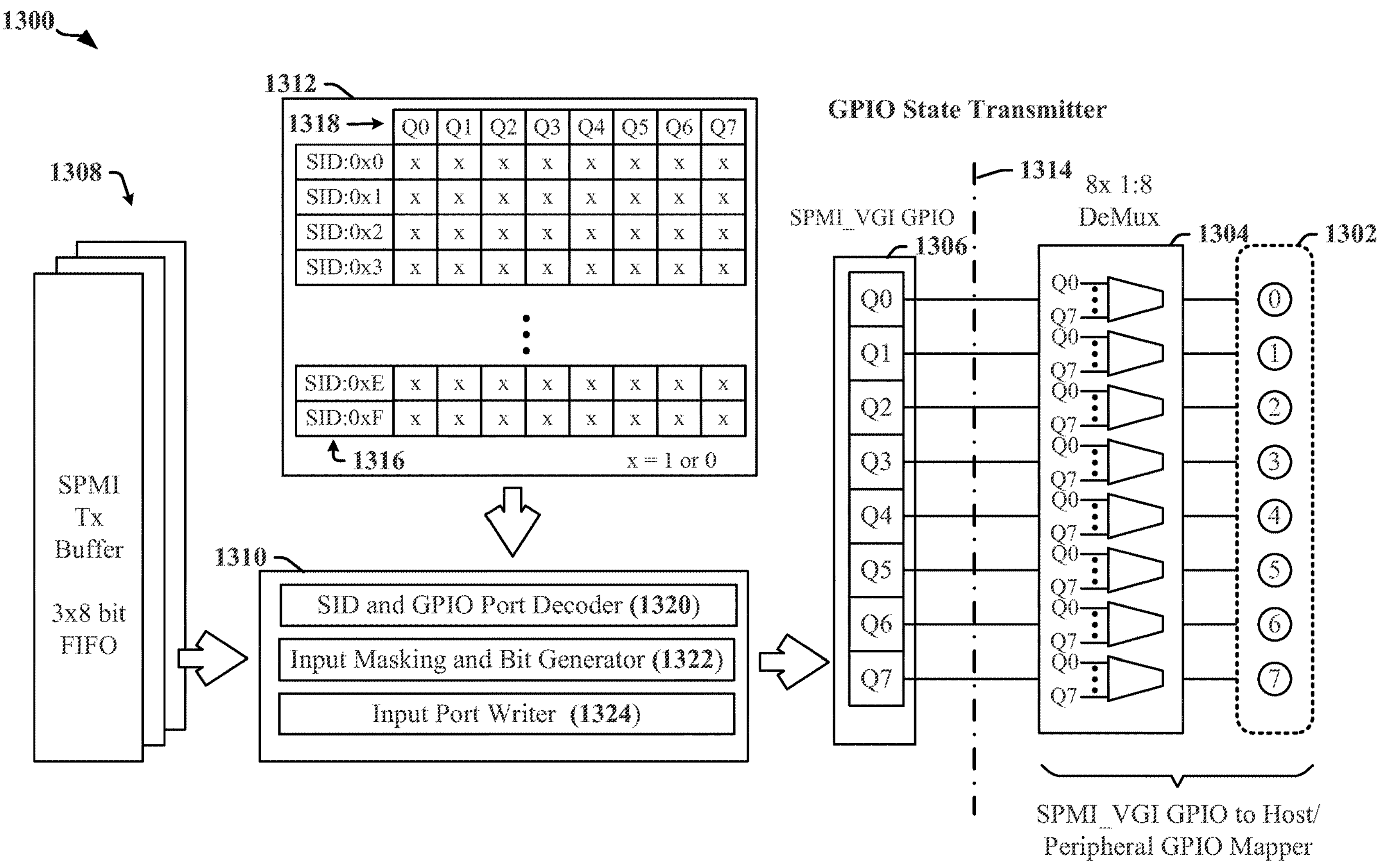
FIG. 13 is a flow diagram that illustrates operation of a GPIO state receiver adapted in accordance with certain aspects disclosed herein.

FIG. 13 is a flow diagram 1300 that illustrates operation of a GPIO state receiver. The flow diagram 1300 relates to an example of a slave device that receives GPIO state information corresponding to a set of GPIOs. The set of GPIOs may include host or peripheral GPIOs 1302. A receive buffer 1308 may be provided to receive data payloads received from the SPMI bus. The receive buffer 1308 may be organized as a FIFO that can handle a 16-byte space to accommodate the maximum data payload received from the SPMI bus. The depth of receive buffer 1308 may be three locations, although the depth may be selected according to implementation requirements and choices.

A slave association map 1312 may be maintained at the slave to process input GPIOs. The slave association map 1312 may define an input GPIO mask to be applied to the incoming GPIOs for a particular slave and particular port of the slave. For example, a transmitting device may be configured to support a maximum number of 16 output GPIO ports, and a slave may be required to have a corresponding number (16) of association maps. Each association map relates to one of the ports, which may be in the enumerated port: #0 through port: # F. In order to accommodate all ports in this example, while maintaining association with all possible devices on the SPMI bus, each device requires 16*16=256 1-byte locations to store the I/P masks.

A receive logic unit 1310 may be provided to receive GPIO state information in accordance with standard SPMI protocols. The receive logic unit 1310 may include certain modules and/or circuits including an SID and GPIO Port Decoder 1320, an input masking and bit generator 1322, and an input port writer 1324.

The SID and GPIO Port Decoder 1320 may decode the SID and GPIO port number of the transmitting device, which is contained in the first byte of the payload. The SID may be mapped to four bits (e.g., [D7:D4]) and the GPIO port-number may be mapped to another four bits (e.g., [D3:D0]). The next byte of the payload includes the GPIO states. Based on the SID and GPIO port number, the receiving device may select an associated input mask to be applied to the received GPIO state byte.

The input masking and bit generator 1322 may be used to apply the mask to the payload. In one example, an input mask bit set to '1' implies that the corresponding GPIO bit is to be used. an input mask bit set to '0' implies that the corresponding GPIO bit is to be ignored.

The input port writer 1324 writes GPIO states to the SPMI_VGI GPIO port 1306. The SPMI_VGI GPIO port 1306 maintains the received GPIOs. A de-multiplexer 1304 is provided to enable routing flexibility for the received GPIOs.

At system start-up, the GPIO association maps 1212, 1312 and masking tables may be configured by the host processor. In some instances, the priority schemes may be dynamically configurable. Upon occurrence of a GPIO state change, a transmission may be initiated. Receiving peripherals respond to GPIOs as enabled in the previously set mask. In some implementations, the association maps 1212, 1312 and mask tables may be dynamically reconfigured.

SPMI Bus Communication Enhancement Based on ID Capture During Bus Arbitration

Figure 14:
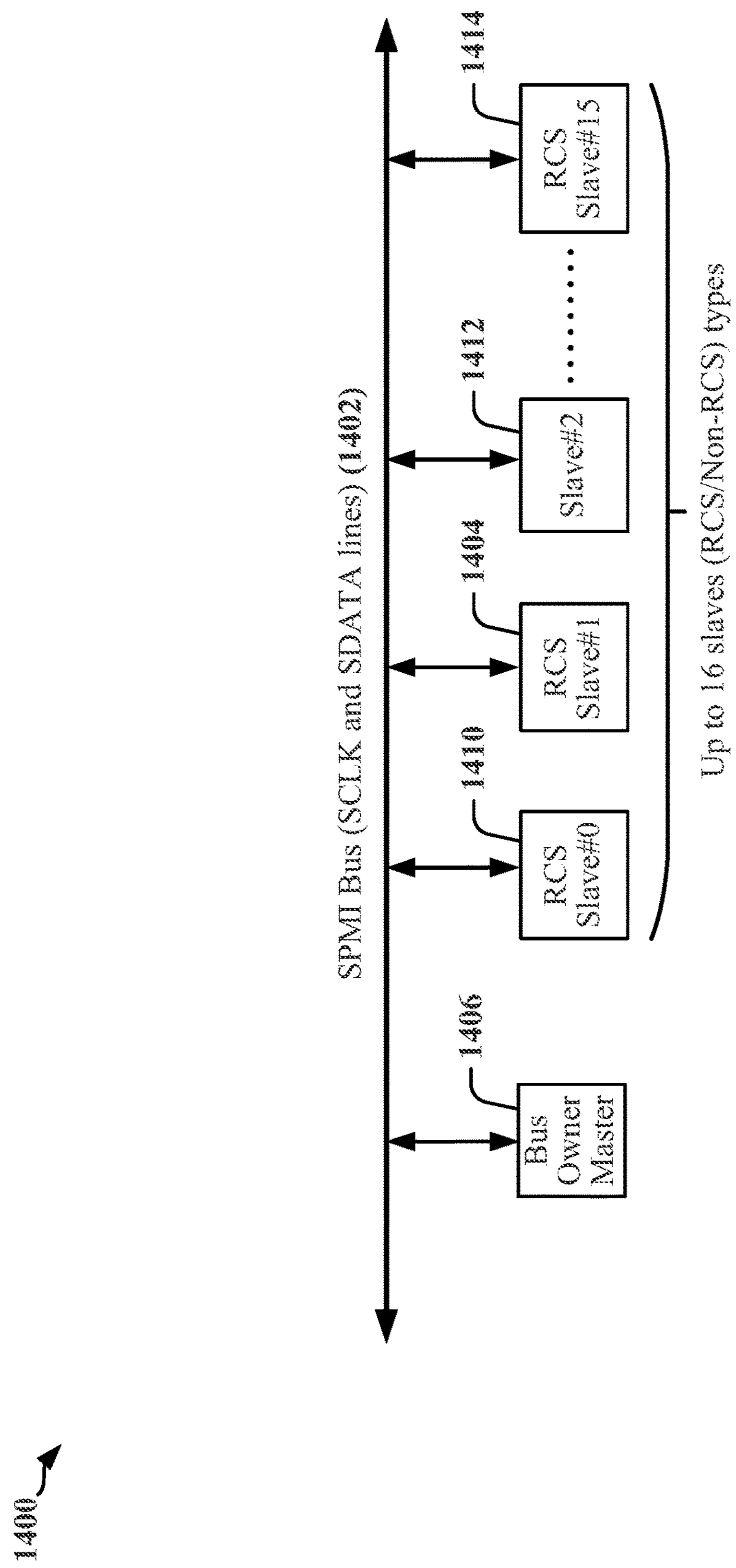
FIG. 14 is a diagram illustrating a bus master and plurality of slaves coupled to a SPMI bus.

FIG. 14 is a diagram 1400 illustrating a bus master and a plurality of slaves coupled to a SPMI bus 1402. In an aspect, up to 16 slaves may share the SPMI bus 1402. Moreover, the slaves may be of different types, e.g., request-capable slave (RCS) types and non-RCS types.

According to certain aspects, an SPMI architecture allows for an RCS to launch a datagram after winning bus arbitration. For example, as shown in FIG. 14, RCS Slave #1 1404 may request access on SPMI bus 1402, win bus arbitration, and thereafter transmit a datagram on the SPMI bus 1402. However, the transmitted datagram may not include a bit field indicating the transmitting RCS's address. Moreover, the SPMI architecture does not provide for informing other devices on the bus 1402 of which device won the arbitration. Hence, once a transmitting wins bus arbitration, there is no mechanism by which receiving device(s) can know which device sends the datagram. For example, once the RCS Slave #1 begins transmitting on the bus 1402, the bus master 1406 and other slaves on the bus (e.g., RCS Slave #0 1410, Slave #2 1412, RCS Slave #15 1414, etc.) are unable to capture the address of the RCS Slave #1 1404. Therefore, the bus master 1406 and other slaves cannot know that the RCS Slave #1 1404 is the device transmitting the datagram.

The lack of knowing which device wins bus arbitration and transmits a datagram creates a "blind" transmission scenario, which is problematic for many use cases. For example, multiple RCS may undesirably write to the same location in a register space. Thus, when a receiving device receives a "blind" datagram transmission containing data from a first RCS, the receiving device may unintentionally overwrite a register space location containing data of another RCS in order to write the data from the first RCS. This unintentional overwriting may otherwise have been avoided if the receiving device was aware of the identity of the RCS that sent the datagram. Accordingly, the present disclosure provides a technique that allows all devices on the bus to be informed of which device wins the bus arbitration and sends a corresponding datagram. The technique allows the datagram receiving device to create an RCS-dependent register address offset (e.g., auto-offset) to prevent unintentional overwriting of a register space location.

Figure 15:
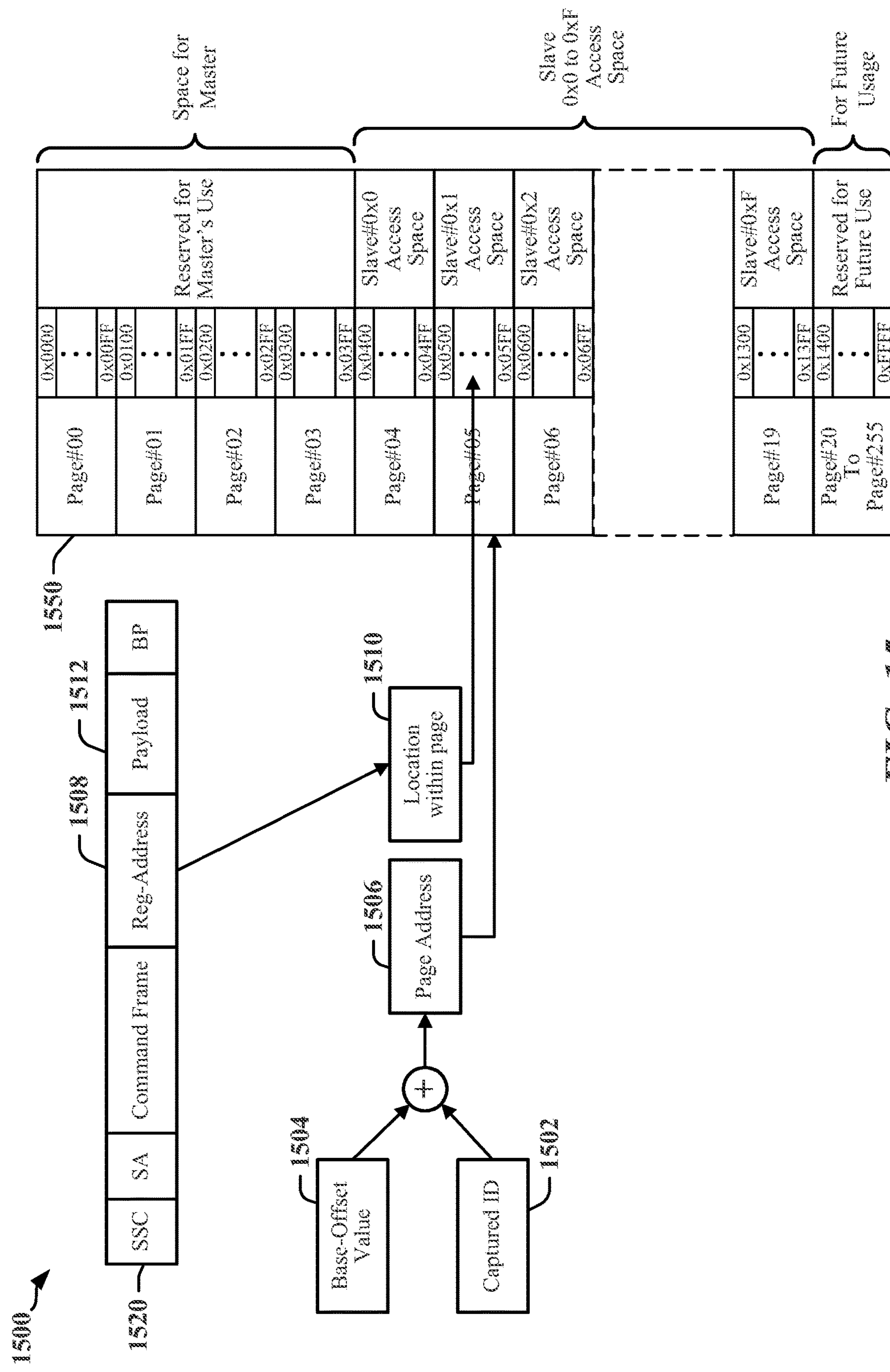
FIG. 15 is a diagram illustrating an architecture for creating an RCS-dependent register address offset to prevent overwriting of a register space location.

FIG. 15 is a diagram 1500 illustrating an architecture for creating an RCS-dependent register address offset to prevent overwriting of a register space location. According to certain aspects, a device may have access of up to 64 KB of register address space 1550. The register address space 1550 may be divided into pages (e.g., 0 to 255 pages) and address locations (locations 0x00 to 0xFF in hexadecimal) within each page. The 64 KB space allows for 16-bit addressing (e.g., 8-bit MSB and 8-bit LSB). Therefore, for an address containing 16 bits, an 8-bit MSB may yield a page number (e.g., Page #0 to Page #255) and an 8-bit LSB may yield an address location (e.g., 0x00 to 0xFF) within the page number.

In an aspect, during an arbitration phase on the SPMI bus, an RCS may send a 4-bit address to identify itself to a bus master and/or other slaves on the bus. All devices on the bus may capture the 4-bit address (ID) of the RCS winning the arbitration. Hence, the bus master and the other slaves on the bus may learn of the identity of the RCS winning the arbitration via the captured ID.

A captured ID 1502 may be used to create an auto-offset to map different RCS to different address regions of a receiving device's register address space 1550. For example, the captured ID 1502 may be concatenated with a base-offset value 1504 to generate an 8-bit MSB sequence equivalent to a page address 1506 in the receiving device's register address space 1550. The base-offset value 1504 may be any constant 4-bit sequence that is pre-configured or set by the receiving device. Moreover, a register address 1508 contained in a datagram 1520 sent by the RCS after winning arbitration may be used as an 8-bit LSB sequence equivalent to an address location 1510 within the page address 1506. Accordingly, by using the captured 4-bit address (captured ID) 1502 of the RCS to generate a specific page address 1506, a specific address region (e.g., a combination of the specific page address 1506 and the address location 1510) in the receiving device's register address space 1550 is assigned to the RCS. Hence, when the datagram 1520 is received by the receiving device, a payload 1512 may be written to the address region specific to the RCS without having to overwrite any other address region containing data for another RCS.

Notably, other RCS devices may also send their own 4-bit addresses (IDs) during an arbitration phase on the SPMI bus. As such, a receiving device may also capture these IDs if such RCS devices win arbitration. The captured IDs may be used to generate specific address regions for the respective RCS devices as described above. As a result, each RCS device on the SPMI bus will automatically be assigned to a unique page in the receiving device's register address space 1550. A captured ID may be automatically cleared from the receiving device's buffer once the datagram is transmitted from the RCS after arbitration.

According to certain aspects, offset-based access to a register address space may be used to standardize register address values for similar tasks, which may allow for uniformity in software driver architecture. Moreover, receiving devices may store arbitration addresses (captured IDs) from past arbitration sequences for debugging purposes, or for any other reason that may be deemed useful from a system design point of view.

Figure 16:
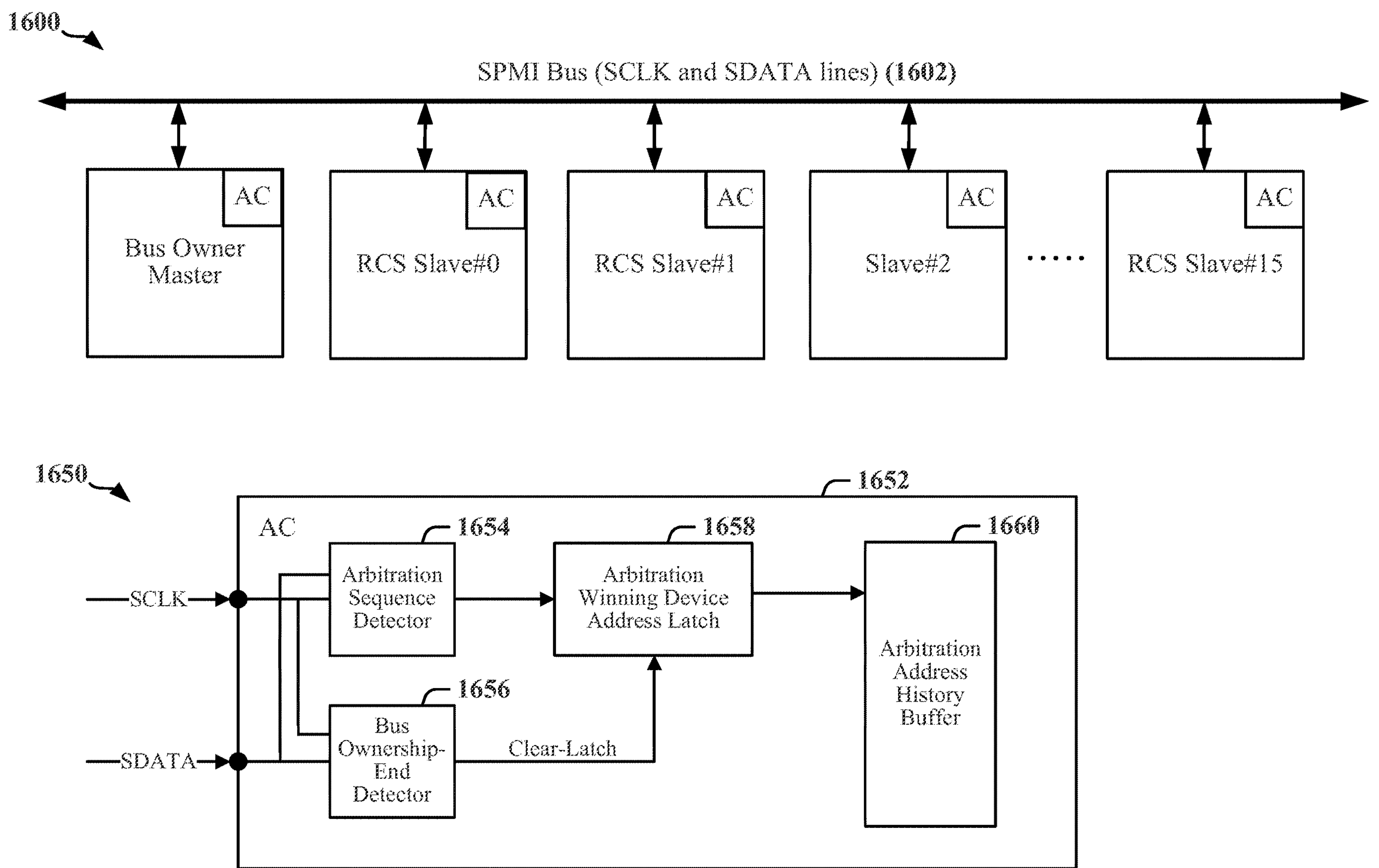
FIG. 16 shows a diagram illustrating a SPMI bus having a bus master and plurality of slaves coupled thereto and a diagram illustrating an architecture for address capture circuitry.

FIG. 16 shows a diagram 1600 illustrating a SPMI bus 1602 having a bus master and a plurality of slaves coupled thereto. In an aspect, up to 16 slaves may share the SPMI bus 1602. The slaves may be of different types, e.g., request-capable slave (RCS) types and non-RCS types. Moreover, each device (master and slaves) on the bus may include address capture (AC) circuitry for capturing an ID (e.g., 4-bit address) of a RCS. FIG. 16 also shows a diagram 1650 illustrating an architecture for address capture circuitry 1652. As shown, the address capture circuitry 1652 may include an arbitration sequence detector 1654, a bus ownership-end detector 1656, an arbitration winning device address latch 1658, and an arbitration address history buffer 1660. A serial clock line (SCLK) and a serial data line (SDATA) may feed into the arbitration sequence detector 1654 and the bus ownership-end detector 1656.

Figure 17:
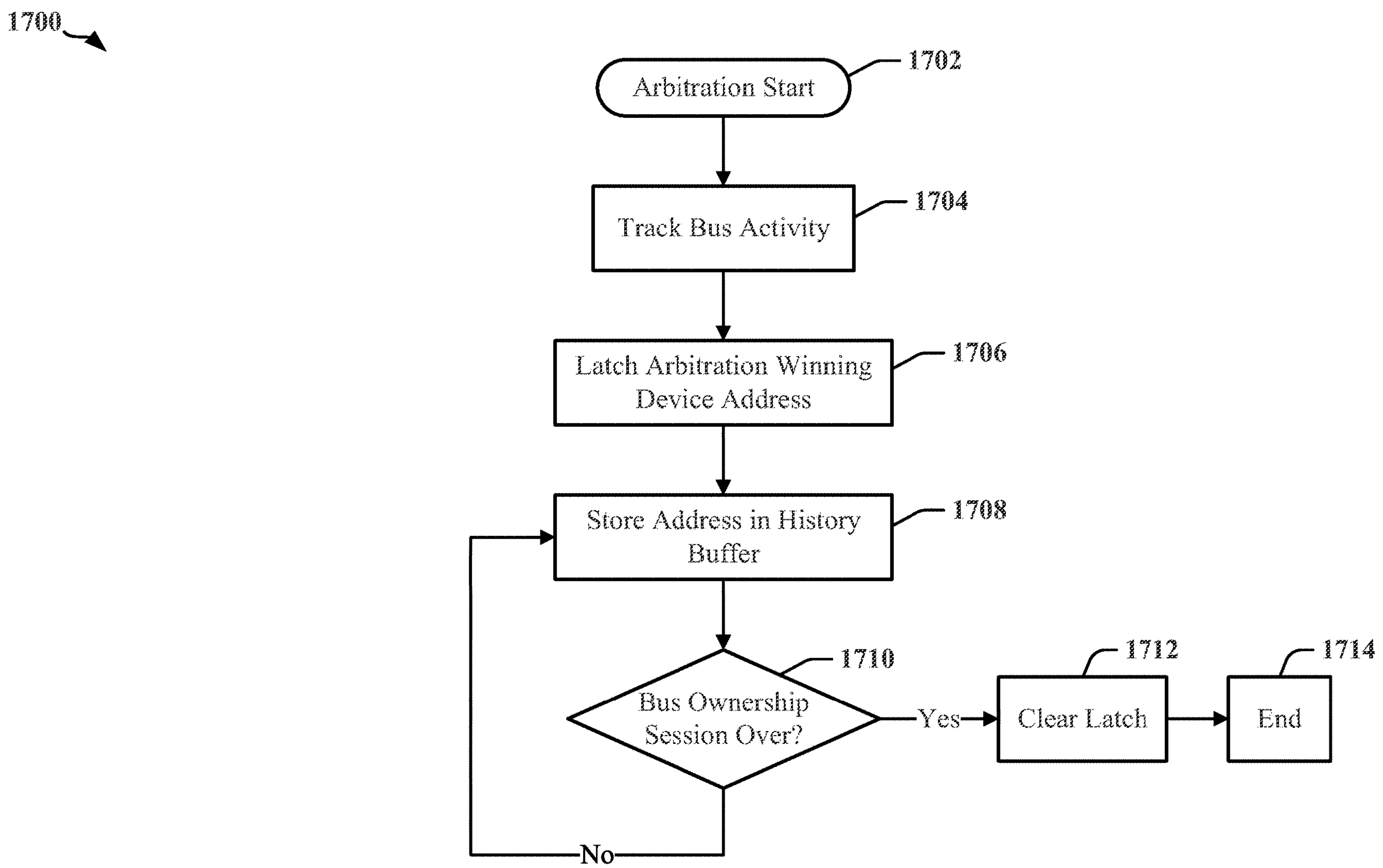
FIG. 17 is a flow chart illustrating a method for capturing an RCS address.

FIG. 17 is a flow chart 1700 illustrating a method for capturing an RCS address. Referring to FIGS. 16 and 17, at block 1702, the arbitration sequence detector 1654 may detect a bus arbitration start and track bus activity at block 1704. Thereafter, when the arbitration sequence detector 1654 determines the RCS winning the bus arbitration, at block 1706, the arbitration winning device address latch 1658 may latch (capture) the address of the winning RCS address. At block 1708, the arbitration address history buffer 1660 may store the winning RCS address. Thereafter, at block 1710, the bus ownership-end detector 1656 may determine whether the RCS's bus ownership session is over. If so, the arbitration winning device address latch 1658 may clear the latch of the winning RCS address. If not, the arbitration address history buffer 1660 may continue to store the winning RCS address.

Although the techniques described above for creating a register address offset to prevent unintentional overwriting of a register space location within a receiving device was based on the captured ID of an RCS winning bus arbitration and a datagram sent on the bus by the RCS, it is contemplated that a bus master may also send datagrams on a SPMI bus. Accordingly, in certain aspects, the techniques described above for creating the register address offset within the receiving device may also be based on the captured ID of the bus master and a datagram sent on the bus by the bus master.

According to other aspects, mechanisms described herein may also work for a point-to-point interface that does not require external bus arbitration, but that the sending device may contain internal subsystems that identify themselves as individual RCS devices and follow equivalent processes as described. In this case, the bus arbitration can be viewed as occurring within the slave device.

According to further aspects, an RCS device (e.g., Device-A) coupled to a first SPMI bus (e.g., Bus-A) may have an association with another SPMI device (e.g., Device-B) that is physically coupled to a different SPMI bus (e.g., Bus-B). In such a case, if the Device-B intends to initiate a communication with a bus master on the Bus-A, the Device-B may initiate the communication through the Device-A. Accordingly, an ID captured by the bus master on the Bus-A would belong to the Device-A, but the actual origin of the communication would be from the Device-B. To let the bus master know that the originator of the communication is the Device-B, the Device-A may access a master register using a predefined register address partitioning that clearly indicates whether the source of the communication is the Device-A or the Device-B.

Examples of Processing Circuits and Methods

Figure 18:
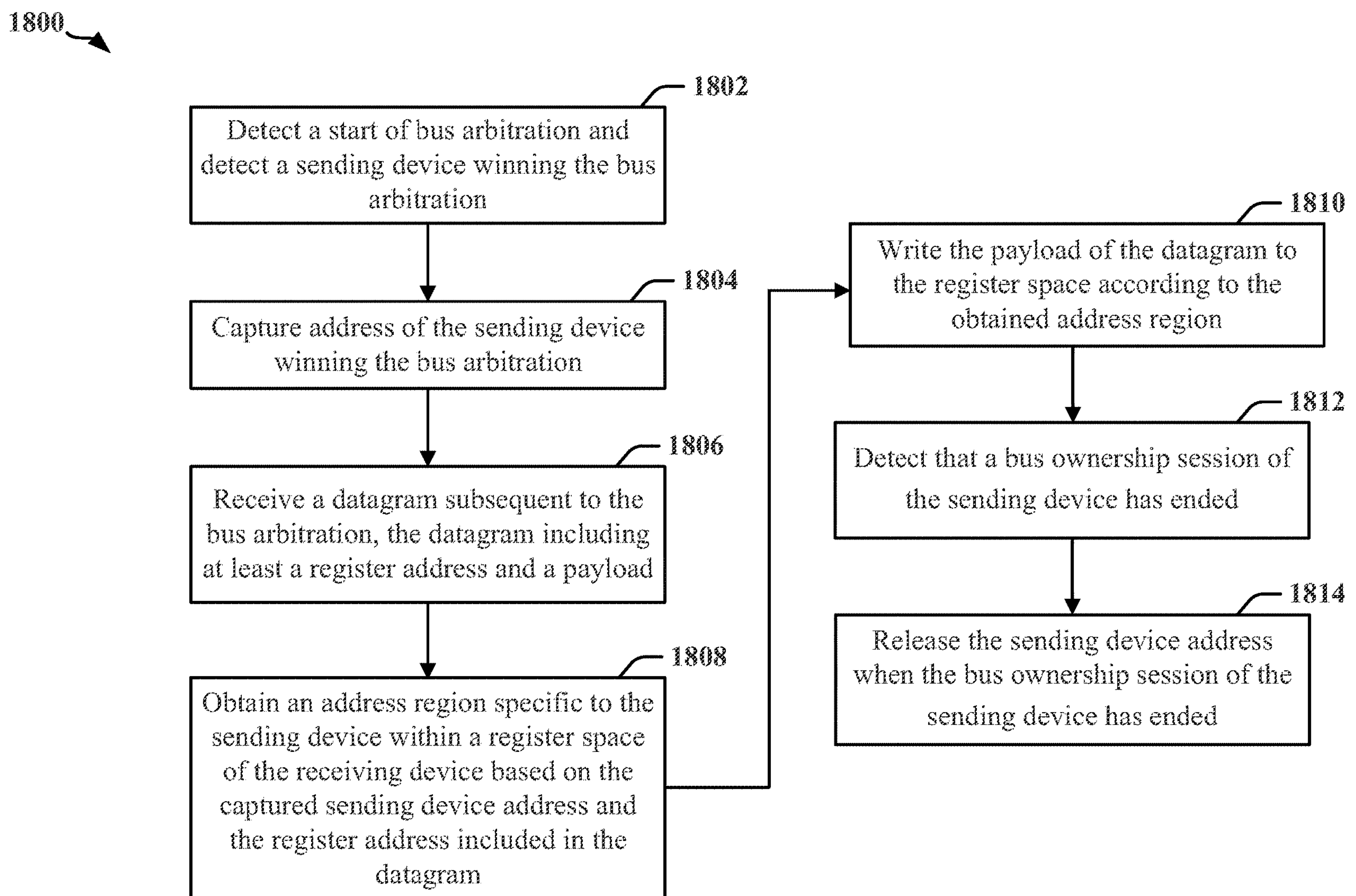
FIG. 18 is a flowchart of a method that may be performed at a receiving device for receiving a datagram from a sending device.

FIG. 18 is a flowchart 1800 of a method that may be performed at a receiving device (e.g., slave or SPMI bus master) for receiving a datagram from a sending device (e.g., request-capable slave (RCS) or SPMI bus master) via a bus.

At block 1802, the receiving device detects a start of a bus arbitration and detects a sending device winning the bus arbitration. At block 1804, the receiving device may capture a sending device address (e.g., captured ID 1502) of the sending device winning the bus arbitration. This may further include the receiving device storing the sending device address in a buffer.

At block 1806, the receiving device may receive a datagram (e.g., datagram 1520) subsequent to the bus arbitration. The datagram may include at least a register address (e.g., register address 1508) and a payload (e.g., payload 1512).

At block 1808, the receiving device may obtain an address region specific to the sending device within a register space of the receiving device based on the captured sending device address and the register address included in the datagram. The receiving device may obtain the address region by obtaining a page address (e.g., specific page address 1506) within the register space based on the captured sending device address and obtaining a page location (e.g., address location 1510) within the page address based on the register address included in the datagram.

In an aspect, when obtaining the page address, the receiving device may concatenate the captured sending device address with a base-offset value (e.g., base-offset value 1504). The captured sending device address may have a length of 4-bits, the base-offset value may have a length of 4-bits, and the page address may have a length of 8-bits.

In a further aspect, the page location may be equivalent to the register address included in the datagram. As such, the page location and the register address included in the datagram may have a length of 8-bits.

At block 1810, the receiving device may write the payload of the datagram to the register space according to the obtained address region. In an aspect, the payload of the datagram may be written to the obtained page address and page location.

At block 1812, the receiving device may detect that a bus ownership session of the sending device has ended. Accordingly, at block 1814, the receiving device may release the sending device address when the bus ownership session of the sending device has ended.

Figure 19:
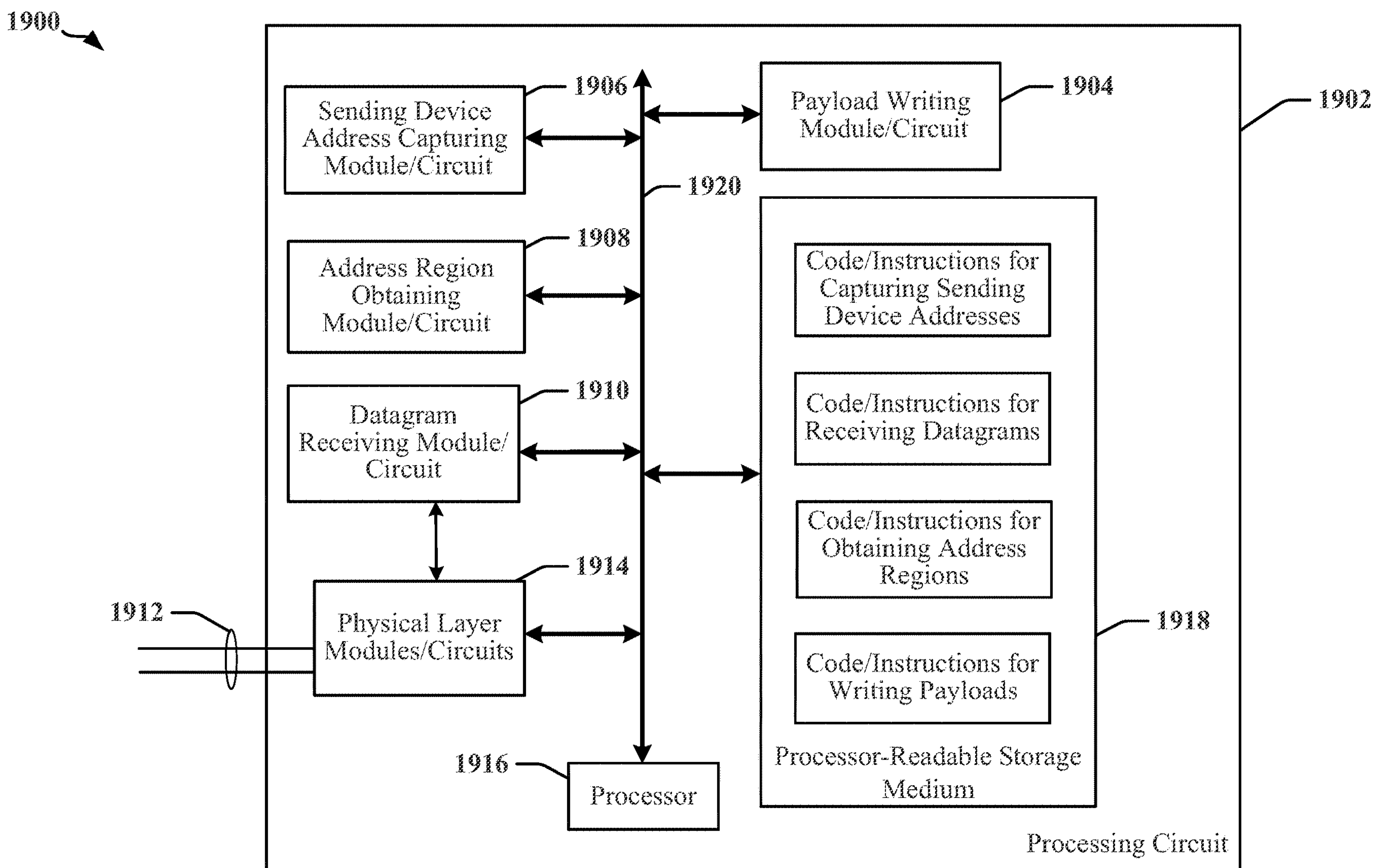
FIG. 19 illustrates an example of a hardware implementation for an apparatus adapted in accordance with certain aspects disclosed herein.

FIG. 19 is a diagram illustrating a simplified example of a hardware implementation for an apparatus 1900 employing a processing circuit 1902. The apparatus may implement a bridging circuit in accordance with certain aspects disclosed herein. The processing circuit typically has a controller or processor 1916 that may include one or more microprocessors, microcontrollers, digital signal processors, sequencers and/or state machines. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the controller or processor 1916, the modules or circuits 1904, 1906, 1908, and 1910 and the processor-readable storage medium 1918. One or more physical layer circuits and/or modules 1914 may be provided to support communications over a communication link implemented using a multi-wire bus 1912 or other communication structure. The bus 1920 may also link various other circuits such as timing sources, peripherals, voltage regulators, and power management circuits, which are well known in the art, and therefore, will not be described any further.

The processor 1916 is responsible for general processing, including the execution of software, code and/or instructions stored on the processor-readable storage medium 1918. The processor-readable storage medium may include a non-transitory storage medium. The software, when executed by the processor 1916, causes the processing circuit 1902 to perform the various functions described supra (e.g., the functions described with respect to FIGS. 15, 16, 17, and 18) for any particular apparatus. The processor-readable storage medium may be used for storing data that is manipulated by the processor 1916 when executing software. The processing circuit 1902 further includes at least one of the modules 1904, 1906, 1908, and 1910. The modules 1904, 1906, 1908 and 1910 may be software modules running in the processor 1916, resident/stored in the processor-readable storage medium 1918, one or more hardware modules coupled to the processor 1916, or some combination thereof. The modules 1904, 1906, 1908, and 1910 may include microcontroller instructions, state machine configuration parameters, or some combination thereof.

In one configuration, the apparatus 1900 includes modules and/or circuits 1904 configured to write a payload, modules and/or circuits 1906 configured to capture/release a sending device address and detect if a bus ownership session of the sending device has ended, modules and/or circuits 1908 configured to detect a start of bus arbitration, detect a sending winning the bus arbitration, and obtain an address region specific to the sending device within a register space, and modules and/or circuits 1910 configured to receive a datagram via a bus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed at a receiving device for receiving a datagram from a sending device via a bus, comprising:

capturing a sending device address during bus arbitration;

receiving the datagram subsequent to the bus arbitration, the datagram including at least a register address and a payload;

obtaining an address region specific to the sending device within a register space of the receiving device based on the captured sending device address and the register address included in the datagram; and writing the payload of the datagram to the register space according to the obtained address region.

2. The method of claim 1, wherein the obtaining the address region includes:

obtaining a page address within the register space based on the captured sending device address; and obtaining a page location within the page address based on the register address included in the datagram.

3. The method of claim 2, wherein the writing the payload includes:

writing the payload of the datagram to the obtained page address and page location.

4. The method of claim 2, wherein the obtaining the page address includes:

concatenating the captured sending device address with a base-offset value.

5. The method of claim 4, wherein:

the captured sending device address has a length of 4-bits;

the base-offset value has a length of 4-bits; and the page address has a length of 8-bits.

6. The method of claim 2, wherein the page location is equivalent to the register address included in the datagram.

7. The method of claim 6, wherein the page location and the register address included in the datagram have a length of 8-bits.

8. The method of claim 1, wherein the capturing the sending device address includes:

detecting a start of the bus arbitration;

detecting the sending device winning the bus arbitration; and capturing the sending device address based on the sending device winning the bus arbitration.

9. The method of claim 1, wherein the capturing the sending device address includes:

storing the sending device address in a buffer.

10. The method of claim 8, further including:

detecting that a bus ownership session of the sending device has ended; and releasing the sending device address when the bus ownership session of the sending device has ended.

11. The method of claim 1, wherein the sending device is a request-capable slave (RCS).

12. The method of claim 1, wherein the sending device is a bus master.

13. A receiving device for receiving a datagram from a sending device via a bus, comprising:

a bus interface; and a processing circuit configured to:

capture a sending device address during bus arbitration, receive the datagram subsequent to the bus arbitration, the datagram including at least a register address and a payload, obtain an address region specific to the sending device within a register space of the receiving device based on the captured sending device address and the register address included in the datagram, and write the payload of the datagram to the register space according to the obtained address region.

14. The receiving device of claim 13, wherein the processing circuit configured to obtain the address region is configured to:

obtain a page address within the register space based on the captured sending device address; and obtain a page location within the page address based on the register address included in the datagram.

15. The receiving device of claim 14, wherein the processing circuit configured to write the payload is configured to:

write the payload of the datagram to the obtained page address and page location.

16. The receiving device of claim 14, wherein the processing circuit configured to obtain the page address is configured to:

concatenate the captured sending device address with a base-offset value.

17. The receiving device of claim 16, wherein:

the captured sending device address has a length of 4-bits;

the base-offset value has a length of 4-bits; and the page address has a length of 8-bits.

18. The receiving device of claim 14, wherein the page location is equivalent to the register address included in the datagram, and wherein the page location and the register address included in the datagram have a length of 8-bits.

19. The receiving device of claim 13, wherein the processing circuit configured to capture the sending device address is configured to:

detect a start of the bus arbitration;

detect the sending device winning the bus arbitration; and capture the sending device address based on the sending device winning the bus arbitration.

20. The receiving device of claim 13, wherein the processing circuit configured to capture the sending device address is configured to:

store the sending device address in a buffer.

21. The receiving device of claim 19, the processing circuit configured to:

detect that a bus ownership session of the sending device has ended; and release the sending device address when the bus ownership session of the sending device has ended.

22. A receiving device for receiving a datagram from a sending device via a bus, comprising:

means for capturing a sending device address during bus arbitration;

means for receiving the datagram subsequent to the bus arbitration, the datagram including at least a register address and a payload;

means for obtaining an address region specific to the sending device within a register space of the receiving device based on the captured sending device address and the register address included in the datagram; and means for writing the payload of the datagram to the register space according to the obtained address region.

23. The receiving device of claim 22, wherein the means for obtaining the address region is configured to:

obtain a page address within the register space based on the captured sending device address; and obtain a page location within the page address based on the register address included in the datagram.

24. The receiving device of claim 23, wherein the means for writing the payload is configured to:

write the payload of the datagram to the obtained page address and page location.

25. The receiving device of claim 23, wherein the means for obtaining the page address is configured to:

concatenate the captured sending device address with a base-offset value.

26. The receiving device of claim 25, wherein:

the captured sending device address has a length of 4-bits;

the base-offset value has a length of 4-bits; and the page address has a length of 8-bits.

27. The receiving device of claim 23, wherein the page location is equivalent to the register address included in the datagram, and wherein the page location and the register address included in the datagram have a length of 8-bits.

28. The receiving device of claim 22, wherein the means for capturing the sending device address is configured to:

detect a start of the bus arbitration;

detect the sending device winning the bus arbitration;

capture the sending device address based on the sending device winning the bus arbitration; and store the sending device address in a buffer.

29. The receiving device of claim 28, further including:

means for detecting that a bus ownership session of the sending device has ended; and means for releasing the sending device address when the bus ownership session of the sending device has ended.

30. A processor-readable storage medium having one or more instructions which, when executed by at least one processor or state machine of a processing circuit of a receiving device for receiving a datagram from a sending device, cause the processing circuit to:

capture a sending device address during bus arbitration;

receive the datagram subsequent to the bus arbitration, the datagram including at least a register address and a payload;

obtain an address region specific to the sending device within a register space of the receiving device based on the captured sending device address and the register address included in the datagram; and write the payload of the datagram to the register space according to the obtained address region.

* * * * *